US008069210B2

(12) United States Patent  (10) Patent No.: US 8,069,210 B2
Gillum et al.  (45) Date of Patent: Nov. 29, 2011

(54) GRAPH BASED BOT-USER DETECTION

(75) Inventors: Eliot C. Gillum, Mountain View, CA (US); Qifa Ke, Cupertino, CA (US); Yinglian Xie, Cupertino, CA (US); Fang Yu, Sunnyvale, CA (US); Yao Zhao, Chicago, IL (US)

(73) Assignee: Microsoft Corporation, Redmond, WA (US)

( * ) Notice: Subject to any disclaimer, the term of this patent is extended or adjusted under 35 U.S.C. 154(b) by 229 days.

(21) Appl. No.: 12/249,732

(22) Filed: Oct. 10, 2008

(65) Prior Publication Data

US 2010/0095374 A1  Apr. 15, 2010

(51) Int. Cl.
*G06F 15/16*  (2006.01)
(52) U.S. Cl. ............ 709/206; 709/224; 709/225
(58) Field of Classification Search ......... 709/204–207, 709/224–225
See application file for complete search history.

(56) References Cited

U.S. PATENT DOCUMENTS

| | | | |
|---|---|---|---|
| 7,047,232 B1 | 5/2006 | Serrano | |
| 7,219,148 B2 * | 5/2007 | Rounthwaite et al. | 709/224 |
| 7,366,764 B1 * | 4/2008 | Vollebregt | 709/207 |
| 7,548,956 B1 * | 6/2009 | Aoki et al. | 709/207 |
| 7,630,949 B1 * | 12/2009 | Duffield et al. | 706/48 |
| 7,809,824 B2 * | 10/2010 | Wei et al. | 709/223 |
| 2005/0021649 A1 * | 1/2005 | Goodman et al. | 709/207 |
| 2005/0041789 A1 * | 2/2005 | Warren-Smith et al. | 379/93.24 |
| 2006/0047769 A1 * | 3/2006 | Davis et al. | 709/207 |
| 2006/0253584 A1 | 11/2006 | Dixon | |
| 2007/0271381 A1 | 11/2007 | Wholey | |
| 2008/0082658 A1 * | 4/2008 | Hsu et al. | 709/224 |
| 2008/0140781 A1 * | 6/2008 | Bocharov et al. | 709/206 |
| 2008/0177846 A1 * | 7/2008 | Feng | 709/206 |
| 2009/0037546 A1 * | 2/2009 | Kirsch | 709/206 |
| 2010/0082800 A1 * | 4/2010 | Wei et al. | 709/224 |
| 2010/0161734 A1 * | 6/2010 | Wang | 709/206 |

OTHER PUBLICATIONS

Thorsten Holz, Measurements and Mitigation of Peer-to-Peer-based Botnets: A Case Study on Storm Worm, Proceedings of the 1st Usenix Workshop on Large-Scale Exploits and Emergent Threats, Article 9, 2008, USENIX Association, Berkeley, CA, USA.

Michael Isard, Dyrad: Distributed Data-Parallel Programs from Sequential Building Blocks, ACM SIGOPS Operating Systems Review, Jun. 2007, pp. 59-71, vol. 41-Issue 3, ACM, New York, NY, USA.

Chris Kanich, The Heisenbot Uncertainty Problem: Challenges in Separating Bots from Chaff, Proceedings of the 1st Usenix Workshop on Large-Scale Exploits and Emergent Threats, Article 10, 2008, USENIX Association, Berkeley, CA, USA.

Balachander Krishnamurthy, Sketch Based Change Detection: Methods, Evaluation, and Applications, Proceedings of the 3rd ACM SIGCOMM conference on Internet measurement, 2003, pp. 234-247, ACM, New York, NY, USA.

(Continued)

*Primary Examiner* — Faruk Hamza

(74) *Attorney, Agent, or Firm* — Vierra Magen Marcus & DeNiro LLP

(57) ABSTRACT

Computer implemented methods are disclosed for detecting bot-user groups that send spam email over a web-based email service. Embodiments of the present system employ a two-prong approach to detecting bot-user groups. The first prong employs a historical-based approach for detecting anomalous changes in user account information, such as aggressive bot-user signups. The second prong of the present system entails constructing a large user-user relationship graph, which identifies bot-user sub-graphs through finding tightly connected subgraph components.

17 Claims, 16 Drawing Sheets

OTHER PUBLICATIONS

Christopher Olston, Pig Latin: A Not-so-Foreign Language for Data Processing, Proceedings of the 2008 ACM SIGMOD international conference on Management of data, 2008, pp. 1099-1110, ACM, New York, NY, USA.

Paul Bächer, Know Your Enemy: Tracking Botnets, Using Honeynets to Learn More About Bots, Honeynet Project and Research Alliance, last modified Mar. 13, 2005, http://www.honeynet.org/papers/bots/.

Moheeb Abu Rajab, A Multifaceted Approach to Understanding the Botnet Phenomenon, Proceedings of the 6th ACM SIGCOMM conference on Internet measurement, 2006, pp. 41-52, ACM, New York, NY, USA.

Anirudh Ramachandran, Filtering Spam with Behavioral Blacklisting, Proceedings of the 14th ACM conference on Computer and communications security, 2007, pp. 342-351, ACM, New York, NY, USA.

Yinglian Xie, Spamming Botnets: Signatures and Characteristics, Applications, Technologies, Architectures, and Protocols for Computer Communication Proceedings of the ACM SIGCOMM 2008 conference on Data communication, 2008, pp. 171-182, ACM, New York, NY, USA.

Hung-Chih Yang, Map-Reduce-Merge: Simplified Relational Data Processing on Large Clusters, International Conference on Management of Data Proceedings of the 2007 ACM SIGMOD international conference on Management of data, 2008, pp. 1029-1040, ACM, New York, NY, USA.

M. Tamer Özsu, Principles of Distributed Database Systems (2nd edition), 1999, p. 657, Prentice-Hall, Inc. Upper Saddle River, NJ, USA.

Trojan Now Uses Hotmail, Gmail as Spam Hosts,BitDefender, Aug. 8, 2007, http://www.bitdefender.com/NW544-world-Trojan-Now-Uses-Hotmail-Gmail-as-Spam-Hosts.html.

Rick Durrett, Random Graph Dynamics, Cambridge Series in Statistical and Probabilistic Mathematics, 2006, Cambridge University Press, New York, NY, USA.

Phil Porras, A Multi Perspective Analysis of the Storm (Peacomm) Worm, Oct. 10, 2007, Technical report, SRI Computer Science Laboratory, http://www.cyber-ta.org/pubs/StormWorm/SRITechnical-Report-10-01-Storm-Analysis.pdf.

Husain Husna, Behavior Analysis of Spam Botnets, Communications Systems Software and Middleware and Workshops, Jan. 2008, pp. 246-253, vol. 6, Issue 10, Comsware 2008.

Li Zhuang, Characterizing Botnets from Email Spam Records, Proceedings of the 1st Usenix Workshop on Large-Scale Exploits and Emergent Threats, 2008, Article No. 2, USENIX Association, Berkeley, CA, USA.

Gary William Flake, Graph Clustering and Minimum Cut Trees, 2003, pp. 385-408, vol. 1, No. 4, Copyright A.K. Peters, LTD.http://www.nanog.org/mtg-0610/presenter-pdfs/feamster.pdf.

M. Patrick Collins, Hit-List Worm Detection and Bot Identification in Large Networks Using Protocol Graphs, Lecture Notes in Computer Science, 2007, pp. 276-295, Springer-Verlag, Germany.

David J. Malan, Rapid Detection of Botnets Through Collaborative Networks of Peers, Jun. 2007, 94 pages, Harvard University, Cambridge, MA, USA.

Anirudh Ramachandran, Revealing Botnet Membership Using DNSBL Counter-Intelligence, Proceedings of the 2nd Conference on Steps to Reducing Unwanted Traffic on the Internet, pp. 8-8, 2006, vol. 2, USENIX Association, Berkeley, CA, USA.

Nick Feamster, Revealing Botnet Membership Using DNSBL Counter-Intelligence, Powerpoint 13 pages, Georgia Tech, http://www.nanog.org/mtg-0610/presenter-pdfs/feamster.pdf.

Yuan Yu Project Manager, DryadLINQ, Microsoft Research, Copyright Microsoft 2008, http://research.microsoft.com/research/sv/DryadLINQ/.

Massive Parallel Processing, Wikipedia, the free encyclopedia, last modified Aug. 3, 2008, http://en.wikipedia.org/wikilMassive parallelism.

Message Passing Interface, http://www-unix.mcs.anl.gov/mpi/.

Moving Average, Wikipedia, the free encyclopedia, last modified Aug. 3, 2008, http://en.wikipedia.org/wikilMovingaverage.

Jack Dongarra project manager, Parallel Virtual Machine (PVM), last modified Apr. 3, 2007, http://www.csm.ornl.gov/pvm/.

Apache. Hadoop, Jul. 8, 2008, Copyright The Apache Software Foundation, http://lucene.apache.org/hadoop/.

Ken Chiang, A Case Study of the Rustock Rootkit and Spam Bot, Proceedings of the first conference on First Workshop on Hot Topics in Understanding Botnets, 2007, pp. 10-10, USENIX Association, Berkeley, CA, USA.

Neil Daswani, The Anatomy of Clickbot.A, Proceedings of the first conference on First Workshop on Hot Topics in Understanding Botnets, 2007, pp. 11-11, USENIX Association, Berkeley, CA, USA.

Jeffrey Dean, MapReduce: Simplified Data Processing on Large Clusters, Communications of the ACM, Jan. 2008, pp. 107-113, vol. 1-Issue 1, ACM New York, NY, USA.

Sanjay Ghemawat, The Google File System, ACM SIGOPS Operating Systems Review, Dec. 2003, pp. 29-43, vol. 37-Issue 5, ACM, New York, NY, USA.

Guofei Gu, BotMiner: Clustering Analysis of Network Traffic for Protocol-and-Structure-Independent Botnet Detection, Georgia Institute of Technology, http://www-static.cc.gatech.edu/~guofei/paper/Gu_Security08_BotMiner.pdt.

Guofei Gu, BotSniffer: Detecting Botnet Command and Control Channels in Network Traffic, Georgia Institute of Technology, http://www-static.cc.gatech.edu/~guofei/paper/Gu_NDSS08_botSniffer.pdf.

* cited by examiner

GRAPH BASED BOT-USER DETECTION

BACKGROUND

Conservative estimates indicate that well over half of all emails sent worldwide are spam emails. In the United States alone, it has been determined that spam email cost organizations more than $13 billion in 2007, including lost productivity and the additional equipment, software, and manpower needed to combat spam email. One factor exacerbating the problem is the ability of spammers to create and use "botnets." Botnets are networks of zombie computers that have been infected with malicious code (a bot) allowing a spammer to send spam through these bot host computers, unknown to the computer owners.

Recently, a particularly malicious botnet spamming method has evolved, where spammers use a botnet to sign up large numbers of user accounts (bot-user accounts) on the public webmail services such as Hotmail® web-based e-mail service. While security protocols, such as CAPTCHA, exist to prevent this practice, spammers are becoming more sophisticated in their methods to defeat such security protocols. As one example, a large number of bots are used to sign up a large number of fake bot-user email accounts. These bots retrieve the signup forms and pass the CAPTCHA (usually images or audio files) back to a central server. This central server is connected to a number of CAPTCHA solvers, which may be human beings and/or bot CAPTCHA breakers. The solution of the CAPTCHA, once found, is sent back to the corresponding bot which then fills the signup form and finishes the signup. Trojan.Spammer.HotLan is one example of a typical worm for email account signup discovered by BitDefender.

Once created, these bot-user accounts are then used by spammers to send out large numbers of spam emails. Using this method, millions of fake email accounts have been created during a short period, and then these bot-user accounts have been used to send out billions of spam emails.

Detecting and defending against this new type of attack has been challenging. Bot-users send spam emails through legitimate Web email providers, making the widely used mail server reputation-based approach to spam detection ineffective. Furthermore, bot-users are sharing computers with legitimate users, making it difficult to detect them individually. Making the problem even harder to detect is the fact that the spammers are using an entire botnet of bot-user accounts. Thus, no single account is sending out high volumes of spam.

SUMMARY

The present system relates to detecting bot-user groups that send spam email over a web-based email service. The bot-user accounts naturally share the bot host computers in order to operate effectively. Moreover, as bot host computers are lost and acquired, spammers need to re-assign bot-user accounts to different bot hosts. The present system, in part, operates by detecting the sharing of bot host computers, and in particular embodiments, by detecting the sharing of the IP addresses of the bot host computers, by the same user accounts in order to identify bot-user groups.

Embodiments of the present system employ a two-prong approach to detecting bot-user groups. The first prong identifies a set of seed accounts which will mark the desired sections of the graph, yielding the other users/IPs associated. One possible embodiment of this first mechanism employs a historical-based approach for detecting anomalous changes in user account information, such as aggressive bot-user sign-ups. This portion of the present system is based on the premise that signup events happen infrequently at a single IP address. Thus, a sudden increase of signup activities is suspicious, and may indicate that the IP address is associated with a bot. One history-based change detection methodology which may be employed in the present system is the exponentially weighted moving average scheme.

The second prong of the present system entails constructing a large user-user relationship graph, which identifies bot-user sub-graphs through either graph clustering techniques or identifying tightly connected graph components. By looking at sub-graph structures, this approach is able to separate normal users from bot-users, as well as bot-users of different botnets. This enables fine granularity behavior based study, which can filter out false positives and help better understand botnet behavior.

Due to the large data volume, the user-user graph based detection is performed on top of a distributed computer cluster. In particular, an algorithm was designed and implemented that parallelizes the computation of graph construction across a set of computers efficiently. The algorithm leverages techniques such as selective filtering and compression to reduce the amount of data to be transferred across the network during the course of computation. Using this algorithm, it is possible to construct graphs of tens of millions of users within only a few hours. Given the massive processing and data involved, the present system employs a cluster of computing devices for distributed and parallel processing of the data.

Once spamming bots and bot users are detected by the two prong approach of the present system, operators can take remedial actions and mitigate the ongoing attacks.

DETAILED DESCRIPTION

The present system will now be described with reference to FIGS. 1-17(b), which in general relate to a system for detecting botnets sending spam using public web-mail services. The following description occasionally refers to Hotmail® web-based e-mail service as a web-mail service to which the present system may be applied. However, it is understood that the present system may be applied to any of a variety of Internet-based services, including for example Gmail® and Yahoo!Email™. The following description first sets forth an example of one hardware architecture for implementing the present system. Following that is a description of the software system running on the hardware architecture for detecting the botnets.

In embodiments of the present system, the computation and processing of data may be performed on a cluster of nine separate but networked computers. It is understood that the computer cluster may include more or less than nine computers in further embodiments. The specifications of one such computer, also referred to as a computing system, are explained below. It is understood that the following description may apply to each computer in the cluster.

Figure 1:
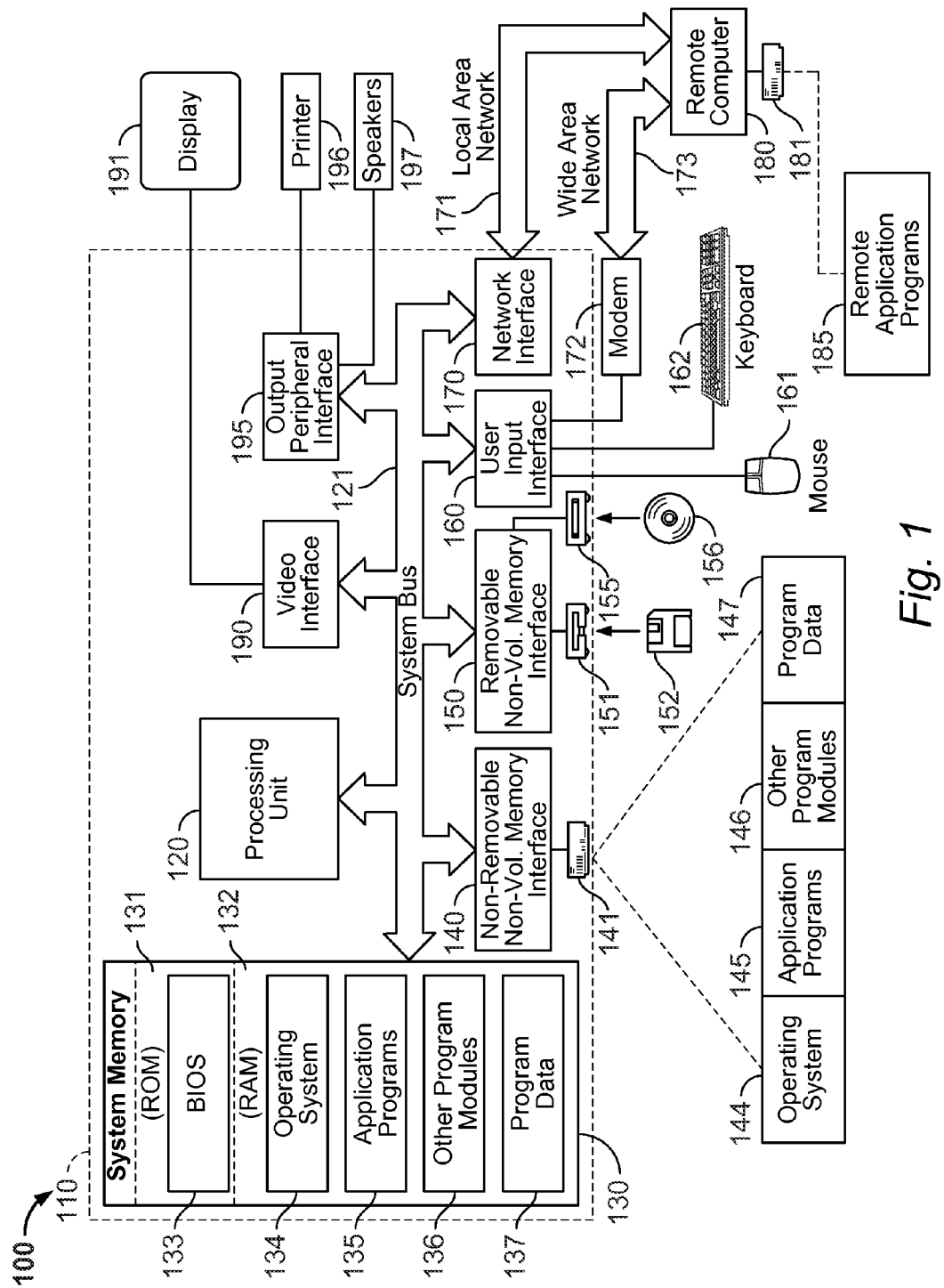
FIG. 1 is a block diagram of a computing system environment capable of implementing the present system.

FIG. 1 shows a block diagram of a suitable general computing system 100. The computing system 100 may form one of the many computing systems in the distributed and parallel processing cluster of computing systems used to implement the present system. The computing system 100 is only one example of a suitable computing environment and is not intended to suggest any limitation as to the scope of use or functionality of the present system. Neither should the computing system 100 be interpreted as having any dependency or requirement relating to any one or combination of components illustrated in the exemplary computing system 100.

The present system is operational with numerous other general purpose or special purpose computing systems, environments or configurations. Examples of well known computing systems, environments and/or configurations that may be suitable for use with the present system include, but are not limited to, personal computers, server computers, multiprocessor systems, microprocessor-based systems, network PCs, minicomputers, mainframe computers, and other distributed computing environments that include any of the above systems or devices, and the like.

The present system may be described in the general context of computer-executable instructions, such as program modules, being executed by a computer. Generally, program modules include routines, programs, objects, components, data structures, etc., that perform particular tasks or implement particular abstract data types. In the distributed and parallel processing cluster of computing systems used to implement the present system, tasks are performed by remote processing devices that are linked through a communication network. In such a distributed computing environment, program modules may be located in both local and remote computer storage media including memory storage devices.

With reference to FIG. 1, an exemplary system for use in the distributed and parallel cluster includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may for example be an Intel Dual Core 4.3 G CPU with 8 GB memory. This is one of many possible examples of processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVDs) or other optical disk storage, magnetic cassettes, magnetic tapes, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/non-removable, volatile/nonvolatile computer storage media that can be used in the exemplary operating environment include, but are not limited to, magnetic tape cassettes, flash memory cards, DVDs, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. These components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball or touch pad. Other input devices (not shown) may be included. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

As indicated above, the computer 110 may operate in a networked environment using logical connections to one or more remote computers in the cluster, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communication over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The present system may make use of distributed and parallel processing on the cluster of computing systems operating in conjunction with each other. A variety of different cluster computing models are known which may be used in the present system, including for example Dryad, DryadLINQ, MapReduce, Map-Reduce-Merge, or other systems. Dryad and DryadLINQ are programming models which support parallel computations over large (e.g., multiple petabyte) data sets on clusters of computers. An advantage of Dryad is that it allows developers to supply the subroutines to be executed and control the data-flow graph among execution nodes. DryadLINQ further combines the Dryad distributed execution engine and the .NET Language Integrated Query (LINQ), enabling the developers to write and debug their applications in a SQL-like query language with the entire .NET library.

MapReduce is a programming model which supports parallel computations over large data sets on clusters of computers. Through a simple interface with two functions, Map and Reduce (commonly used in functional programming), the MapReduce model facilitates parallel implementation of many real-world tasks such as data processing for search engines and machine learning. As an alternative to MapReduce, the present system may be implemented using a Map-Reduce-Merge model. As is known, this model adds a Merge phase to MapReduce and the new model can express relational algebra operators as well as implement several join algorithms. Another possibility is Pig Latin, which is a language that wraps the low level MapReduce procedures and provides high-level SQL-like query interfaces. Still other cluster computing models are contemplated for implementing the present system.

The method of the present system performed on the above-described computing cluster will now be described with reference to FIGS. 2-17(b). The method makes use of the fact that bot-users share IP addresses when they log in and send emails. This is true because spammers reassign bot-user accounts to different IP addresses on different bot host computers. This activity results in a high correlation among bot-user accounts, when viewed in aggregation, which fact is leveraged by the present system to distinguish bot-user accounts from legitimate user accounts.

In order to leverage the close relationship among bot-user accounts (also referred to herein as "bot-users"), the present system employs a novel graph based bot-user account detection approach. This approach constructs a huge user-user relationship graph, and identifies bot-user account patterns or sub-graphs through finding tightly connected subgraph components, such as for example by leveraging random graph theory for connected subgraph component identification. By looking at sub-graph structures, this approach is able to separate normal users from bot-users, as well as bot-users of different botnets. This enables fine granularity behavior based study, which can filter out false positives and help better understand botnet behavior.

The bot-user account detection method of the present system may be performed by a two prong approach. The first prong identifies an initial "seed" set of users/IPs which will mark part of the graph of interest. It may involve examining historical data to detect anomalous changes. In embodiments, the historical data used in the present system is when users sign up and open new accounts. The second prong involves generating user-user graphs relating to when users login and send emails. The immediately following paragraphs focus on the first prong—detecting a seed set, which in one embodiment is aggressive user account signup events. This is a significant step in that it can limit the number of bot-users a spammer can obtain in the first place. Consequently, spammers will have to use these bot-users repeatedly to send out a massive amount of spam.

In order to detect aggressive bot-user signups, a history-based change detection scheme may in part be used. The method is based on the premise that signup events happen infrequently at a single IP address. Even for a proxy, the number of users signed up from the corresponding IP address should be roughly consistent over time. A sudden increase of signup activities is suspicious, indicating that the IP address may be associated with a bot. One such history-based change detection scheme which may be employed is an exponentially weighted moving average, or EWMA. EWMA is a known moving average based algorithm to detect sudden changes. A moving average refers to a statistical technique used to analyze a set of data points by creating an average of one subset of the full data set at a time. So a moving average is a set of numbers, each of which is the average of the corresponding subset of a larger set of data points. An exponentially weighted moving average applies weighting factors which decrease exponentially. The weighting for each older data point decreases exponentially, giving much more importance to recent observations while still not discarding older observations entirely.

As used in the present context, given a time series data, let the observation value at time t be $Y_t$. Let $S_t$ be the predicted value at time t and $\alpha (0 \leq \alpha \leq 1)$ be the weighting factor. EWMA predicts $S_t$ as:

$$S_t = \alpha \times Y_{t-1} + (1-\alpha) \times S_{t-1} \quad (1)$$

To quantify the predication accuracy, the absolute prediction error $E_t$, and the relative prediction error $R_t$, may be defined as:

$$E_t = Y_t - S_t, R_t = Y_t / \max(S_t, \epsilon), \quad (2)$$

where $\epsilon$ is introduced to avoid the divide-by-zero problem.

Figure 2:
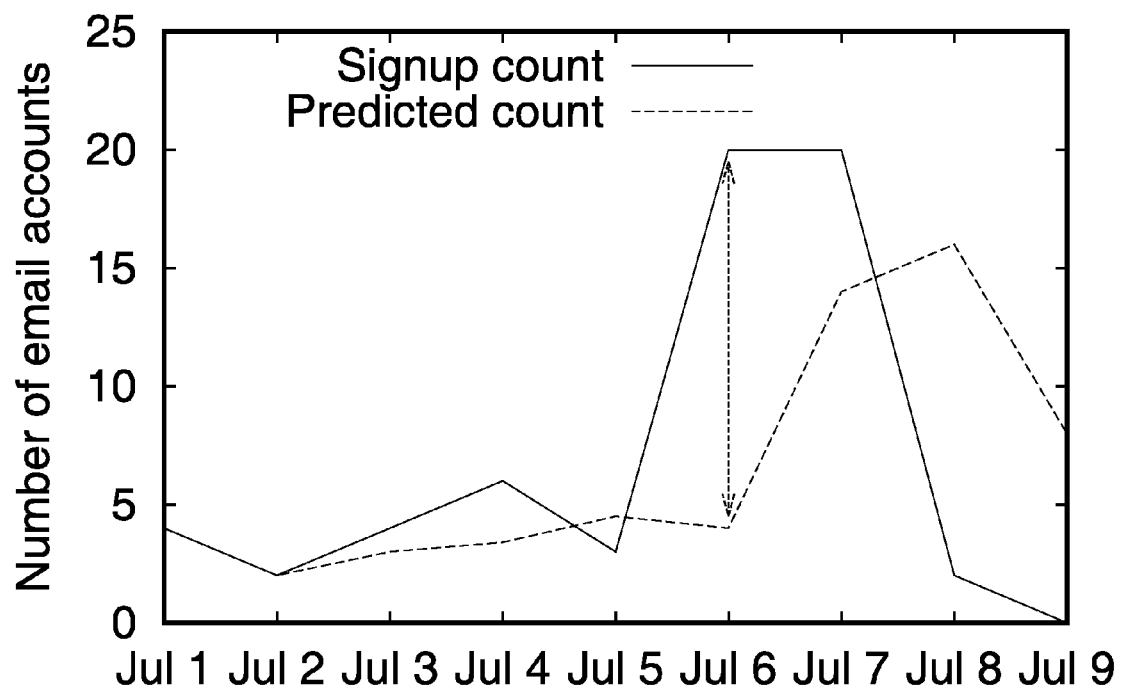
FIG. 2 is an example graph of historical data allowing the detection of anomalous changes in user account information.

A large prediction error $E_t$ or $R_t$ indicates a sudden change in the time series data and is at least an indication of abnormal signup activities from botnet users. Using this method, not only can the start of a sudden change be detected, but it can also detect the end of such a change. To do so, the data is examined to detect whether the number of new users signed up has dropped to the number of users signed up before a sudden change. If so, then the sudden change has ended. The time window may be defined between the start and the end of a sudden change as the anomaly window. FIG. 2 shows an example of applying EWMA on the signup history of one IP address over a sample time period of July 1 through July 9. On July 6, there was a sharp increase in the number of user signups for this IP. The smoothed prediction value cannot catch up to the sudden change immediately, resulting in a large prediction error. In this case, the present system detects the anomaly window as from July 6 to July 7. The accounts signed up during this anomaly window are suspicious bot-users.

In embodiments, the time unit of a day may be used, though other time units are contemplated. Using a day as the measured unit of time, $Y_t$ is the daily number of signed up accounts and $E_t$ is the predicted daily signup of accounts. It has been determined from examining two years of the Hotmail® web-based e-mail service signup log, 99% of IP addresses have only a few account signups per day. Accordingly, the threshold $\delta_E$ may be set to something small, such as for example an eightfold increase in the volume of signups. For proxies, a small absolute prediction error threshold will induce a high false positive rate. So the relative prediction error $R_t$ may be used instead and the threshold $\delta_R$ may be conservatively set for example to a fourfold increase in the volume of signups. For any IP address, if both $E_t > \delta_E$ and $R_t > \delta_R$, the IP address may be considered to be suspicious in day t. It is understood that other threshold values may be selected for $\delta_E$ and $\delta_R$ in alternative embodiments of the present system.

The above-described method has advantages, including that it can be applied in real time. However, the above method may be augmented further by examining data relating to when users login and send emails. With many email accounts at hand, a spammer can manage to send out a large amount of spamming emails by having each bot-user account send only a few emails per day. The email sending behavior of each individual bot-user will thus be stealthy and hard to detect by history based methods such as EWMA described above. Thus, in order to examine this data, a graph-based detection method may be used, as explained in the immediately following paragraphs.

Two or more bot-users controlled by the same spammer are not independent. A spammer controls both a set of bot host computers and a set of bot-user accounts, where the number of bot-users is typically much larger than the number of bot host computers. Over time, bot host computers are lost (i.e., the malicious code is detected and deleted) and new bot host computers are acquired. As bot host computers come and go, bot-users may be assigned to different bot host computers during the spamming attack. As a result, bot-users share a common set of bot host computers over a period of time. Two bot-users, stealthy or aggressive, are thus related by the common bot host computers they use to send spam. A bot-user group may be defined as a set of bot-users that are controlled by the same spammer and are working in a collaborative way to send spam emails.

Figure 3:
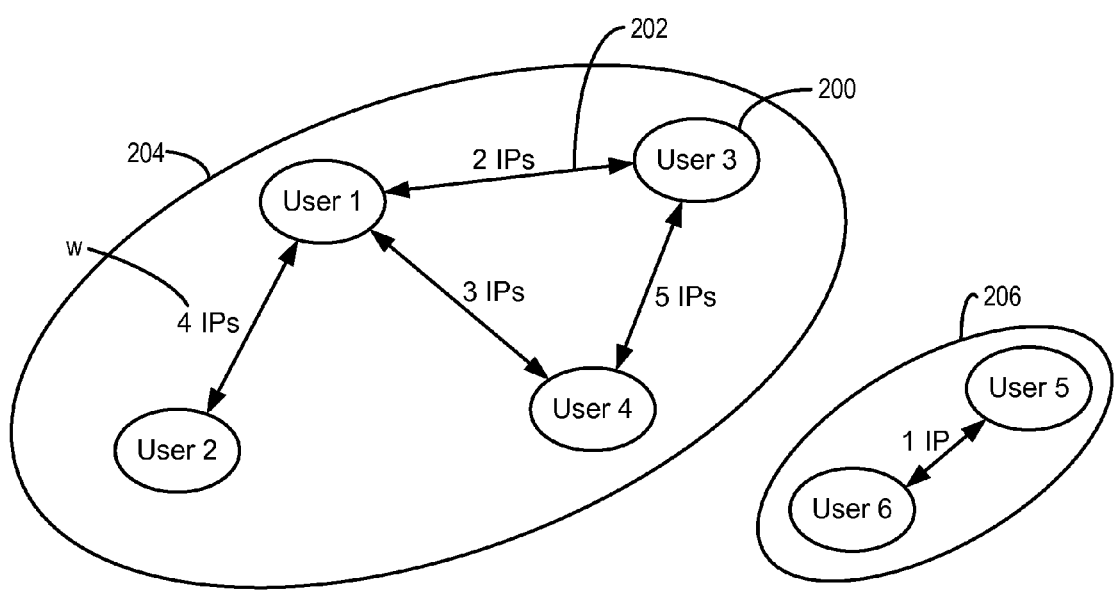
FIG. 3 is a sample user-user graph showing user accounts as vertices and shared IP addresses as edges connecting vertices according to embodiments of the present system.

Referring initially to FIG. 3, the relationship induced by such bot-sharing may be used to build a user-user graph. A vertex 200 in the graph (one of which is labeled) is a bot-user account. Two vertices 200 may be connected by an edge 202 (one of which is labeled). Vertices 200 are connected by an edge 202 if the corresponding two bot-user accounts share at least $T \geq 1$ (one or more) different IP addresses within a period of time (e.g., within one day, though the selected time period may be greater or lesser than a day in further embodiments). A bot host computer is identified by its IP address in the email server log of the web-based e-mail service. Each edge in the graph is also assigned a weight, w, defined by the number of shared IP addresses between the two joined vertices. The result is a user-user graph that captures the correlations among bot-users.

As explained hereinafter, user accounts linked by shared IP addresses with a weight of greater than some threshold, e.g., 2, may be considered a bot user group (204), while user accounts sharing less than the threshold number of IP addresses may be considered normal users (206). It is understood that the number of users and their relatedness shown FIG. 3 is simplified for explanation purposes. The actual user-user graph computed by the present system would be many orders of magnitude larger than that shown in FIG. 3.

Note that with dynamic IP and proxy, normal users may share IP addresses too. For example, a dialup IP address may be used by many users in a day and a user may be assigned different IP addresses over time. With proxies, many email accounts may also share IP addresses, since (1) in the server log these accounts will appear to login from a few IP addresses, and (2) one account may switch its proxy server for reasons such as load balancing. To reduce the effect of dynamic IP and proxy, multiple shared IP addresses in the same Internet autonomous system ("AS") is only counted as one shared IP, as one possible embodiment of handling this difficulty. As used herein, an AS is a collection of IP networks and routers under the control of one or more network operators that presents a common, defined routing policy to the Internet. As used herein, "shared IP addresses" are the number of different ASes of the shared IP addresses. It is very rare to have a group of normal users that frequently travel and use the same set of IP addresses.

The user-user graph formed by bot-users is drastically different from the graph formed by normal users, since bot-users have a higher chance of sharing IP addresses. Specifically, the bot-user graph contains a giant connected component (204, FIG. 3), i.e., a group of connected vertices that occupies a significant portion of the whole graph, while the normal-user graph contains only isolated vertices and/or very small connected components. The condition for the appearance of the giant component may be identified through graph clustering techniques or graph cut methods. An example method is described as follows.

In a typical scenario where a spammer manages a database of bot-user accounts under his/her control, when a bot host computer is up, it requests one or more bot-user accounts and uses them to send spam. For the purposes of the following example, assume a spammer randomly assigns n bot-users to m bot host computers each day for a duration of e days. Two vertices are connected by an edge if they share more than T bot host computers. Assume further in this example that the above spamming strategy may be simulated for various T with n=10000, m=500, and e=10. For each T, the simulation may be run 10 times, and the average size of the largest connected component may be computed.

As an example of results which may be obtained in the above example, it may be seen that when the threshold is set at T≦3, there is a single giant component with 9778 vertices, and when the threshold is set at T>3, the size of the largest component is only 7 vertices. There exists a sharp decrease in the size of the largest connected component when T across the transition point of T=3. It may be assumed that a disproportionate drop off in the amount of connected vertices from one weight to the next successive weight indicates one or more bot-user groups at the lower weight In the following paragraphs, it is shown how random graph theory may be used to model the transition point for the appearance and the size of the giant component in the user-user graph. Random graph theory is known and is set forth for example in R. Durrett, *Random Graph Dynamics*, Cambridge University Press (2006), which publication is incorporated by reference herein in its entirety.

The random graph model may be denoted $G(n, p)$, which generates an n-vertex graph by assigning an edge to each pair of vertices with probability $p \in (0, 1)$. The generated graph is referred to as an instance of the model $G(n, p)$. The parameter p determines when a giant connected component will appear in the graph generated by $G(n, p)$ in accordance with the following theorem.

Theorem 1: For the $G(n, p)$ random graph model, if $p=\lambda/n$ and $\lambda<1$ then, when n is large, most of the connected components of the generated graph are small, with the largest having only $O(\log n)$ vertices. In contrast, if $\lambda>1$ there is a constant $\theta(\lambda)>0$ so that for large n the largest component has $\sim\theta(\lambda)n$ vertices and the second largest component is $O(\log n)$. Here $X_n \sim b_n$ means that $X_n/b_n$ converges to 1 with probability→1 as n→∞.

The above theorem states that, given a large number n, if the probability $p<1/n$, then the graph generated by $G(n, p)$ will not have any giant connected component (all components have fewer than $O(\log n)$ vertices). On the other hand, if $p=\lambda/n$ and $\lambda>1$, then the graph generated by $G(n, p)$ will contain only one single giant component whose number of vertices are in the order of $O(n)$, and all remaining components have less than $O(\log n)$ vertices. The size of the giant component depends on the probability $p=\lambda/n$, where $\lambda>1$. Specifically, given $\lambda$, the size of the single giant component is $\sim(1-\rho)n$. Here $\rho$ is the solution of $\rho=\exp(\lambda(\rho-1))$.

The following Theorem 2 can be derived from Theorem 1.

Theorem 2: A graph generated by $G(n, p)$ has average degree $d=n p$. If $d<1$, then with high probability the largest component in the graph has size less than $O(\log n)$. If $d>1$, with high probability the graph will contain a giant component with size at the order of $O(n)$.

If the user-user graph follows the random graph model, then for a group of bot-users that share a set of IP addresses, the average degree d will be larger than one, and the giant component will appear with high probability. On the other hand, normal users rarely share IP addresses, and the average degree d will be far less than one when the number of vertices is large, which is the typical case. The resulting graph of normal users will therefore contain isolated vertices and/or small components.

The appearance of giant component differentiates bot-user graph from normal user graph. Detecting bot-users can then simply be done by identifying the transition point and the giant component. The following paragraphs show how the user-user graphs of actual data from web-based email systems conform to the random graph theory.

Spammers typically use one of three spamming strategies for assigning bot-user accounts to bot host computers:

Bot-user accounts are randomly assigned to bots. All the bot-user pairs have the same probability p to be connected by an edge. By definition, the resulting user-user graph is a random graph conforming to the random graph model.

The spammer keeps a queue of the bot-users. Upon request from a bot host computer when it comes online, the spammer assigns to the requesting bot computer the top k available (currently not used) bot-users in the queue. While the bot-users are in some order, the bot host computers come on line in a random order. To be stealthy, a bot makes only one request for k bot-users each day.

The third case is similar to the second case, except that there is no limit on the number of bot-users a bot can request for one day. Specifically, a bot requests one bot-user account each time, and it asks for another account after finishing sending enough spam emails with the current email account during its online period.

The above typical spamming strategies may be simulated and the corresponding user-user graph may be constructed. In the simulation, assume 10,000 spamming accounts (n=10, 000) and 500 bot host computers in the botnet. Assume further that all bot hosts are active for 10 days and the bot hosts do not change IP addresses.

Three simulation models can be provided for the three strategies above. In the second model for the second of the above spamming strategies, let k=20, which is equal to the number of bot-user accounts divided by the number of bot host computers. In the third model for the third of the above spamming strategies, it is assumed that the bot hosts go online with a Poisson arrival distribution and the length of bot host alive time fits the exponential distribution.

In the simulation, the threshold T may be varied. T is the least number of shared IP addresses for two vertices to be connected by an edge. For each given T, ten simulations may be run for each model to generate ten graphs. The average number of vertices of the largest connected component may then be computed for each model at every T.

Figure 4:
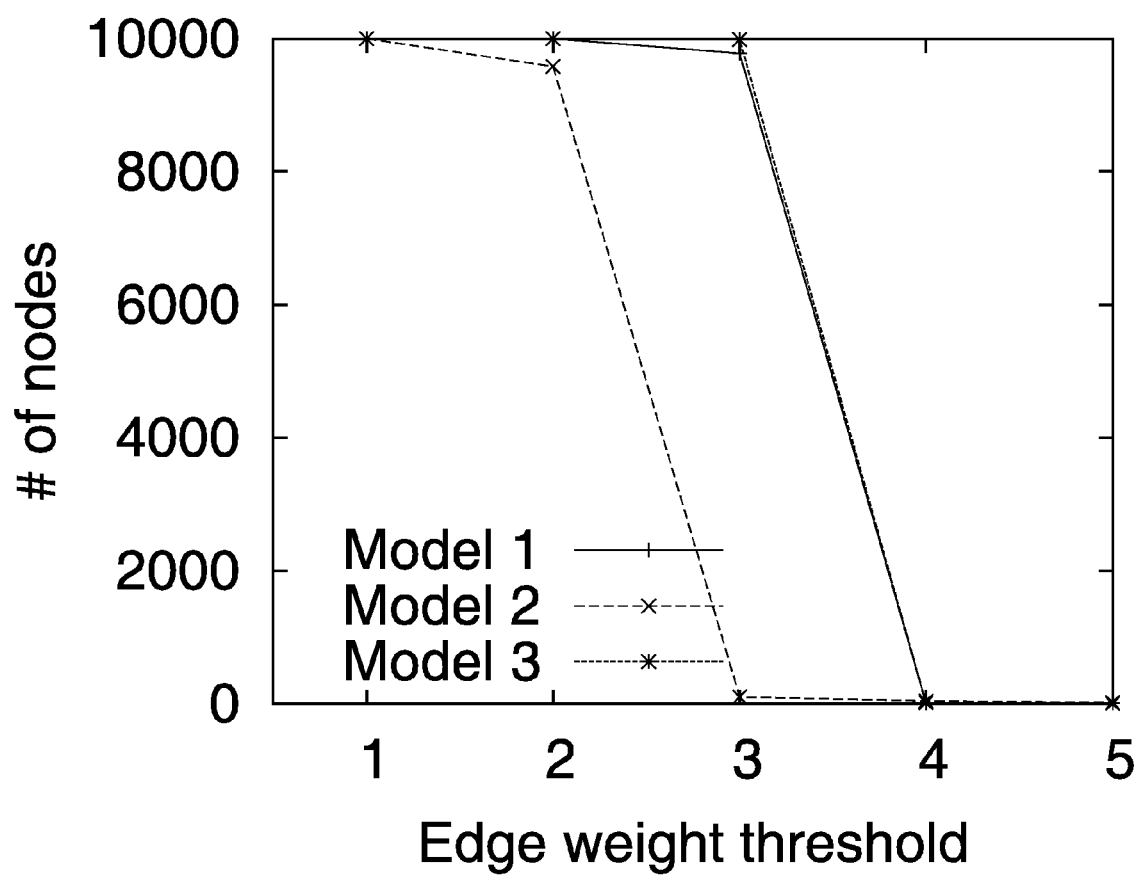
FIG. 4 is a graph of simulation results for three different models of dealing with spamming strategies showing the number of user accounts versus edge weight threshold.
Figure 5A:
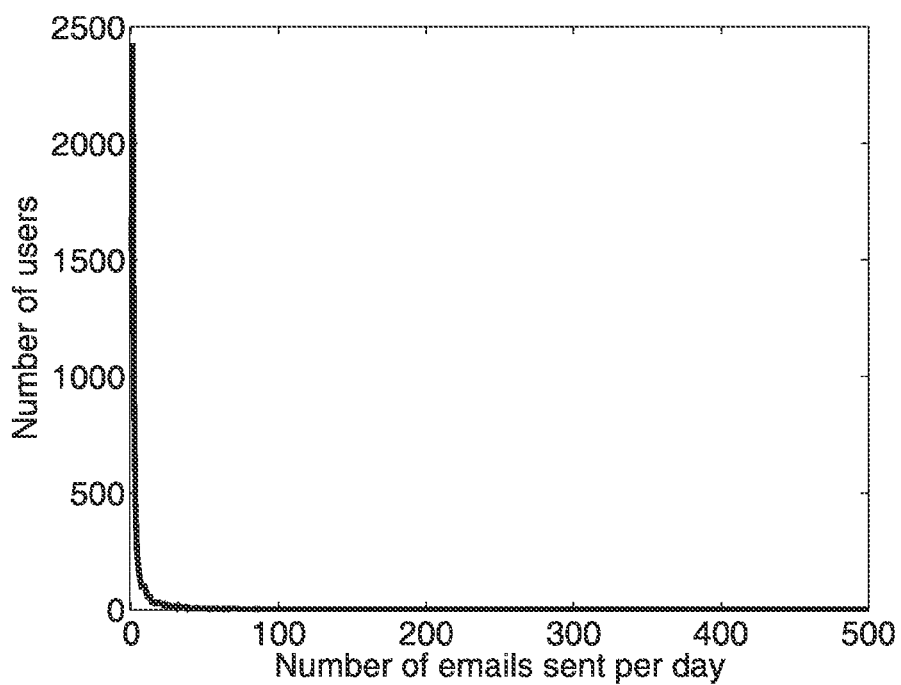
FIGS. 5(a) and 5(b) shows histograms of the volume of emails sent in a day and the size of the emails for normal email users.
Figure 5B:
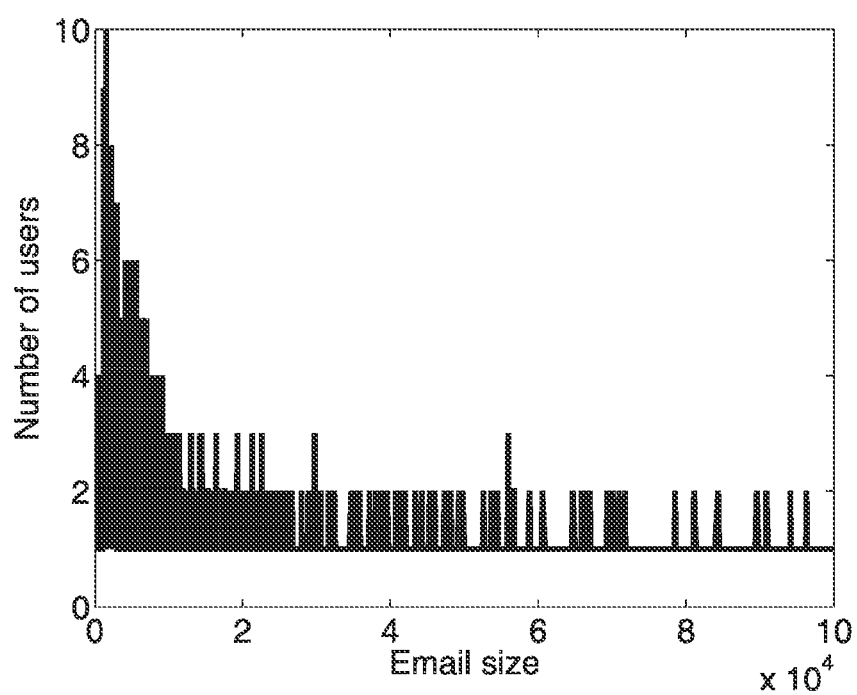
Figure 6A:
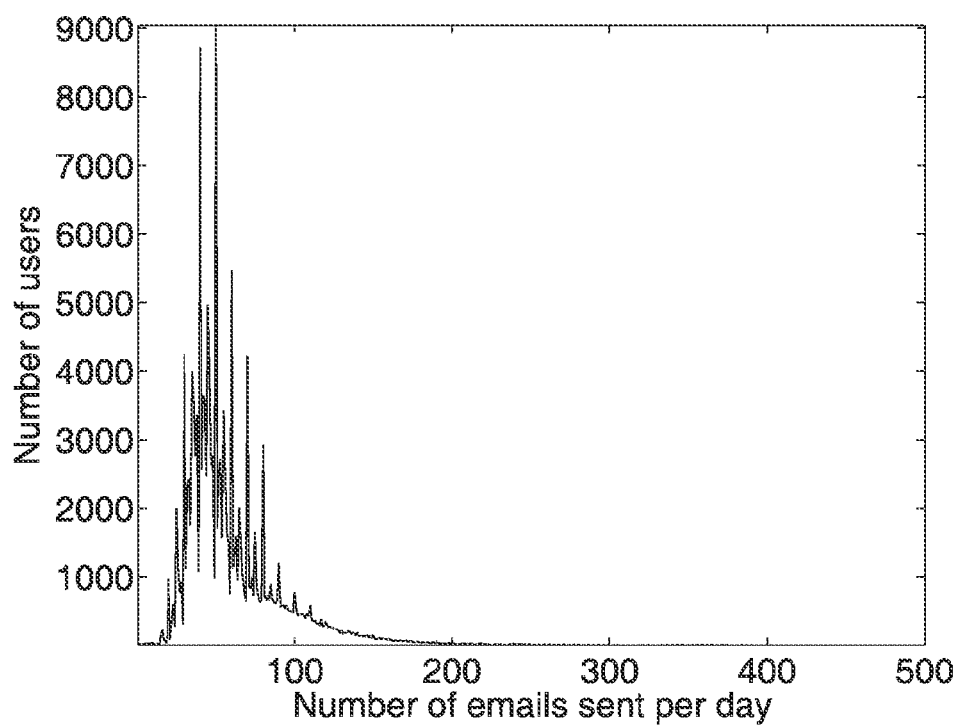
FIGS. 6(a) and 6(b) shows histograms of the volume of emails sent in a day and the size of the emails for aggressive bot users.
Figure 6B:
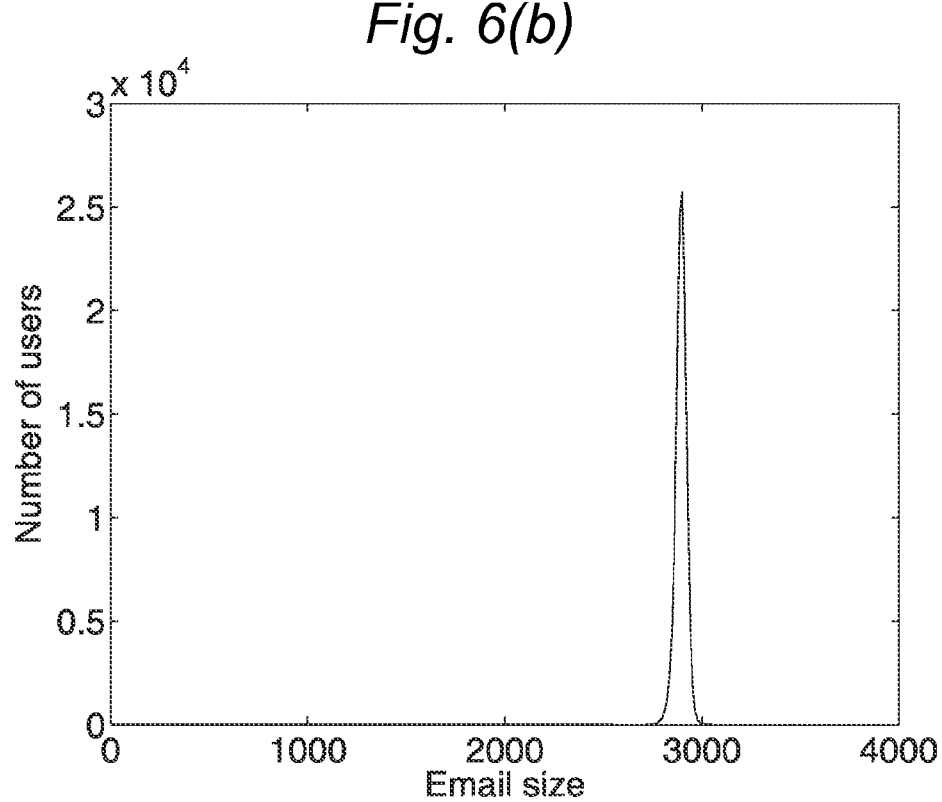

FIG. 4 shows the simulation results for the different models (models 1 and 3 closely simulate each other in FIG. 4). It can be seen that there is a sharp increase of the size of the largest connected component as the threshold T decreases (i.e., the probability of two vertices being connected increases). In other words, there exists some transition point of T. If T is above this transition point, the graph contains only isolated vertices and/or small components. Once T crosses the transition point, the giant component appears. This is consistent with the random graph model, suggesting that user-user graphs generated by typical spamming strategies fit well with the random graph model, and will exhibit the transition phenomenon of the appearance of the giant component. As shown, different spamming strategies may lead to different transition values. The second model has a transition value of T=2, while the first and third models have the same transition value of T=3.

As shown above and in FIG. 4, the bot-user group forms a connected component in the user-user graph. Intuitively one could identify bot-user groups by simply extracting the connected component from the user-user graph generated with some predefined threshold T (the least number of shared IP addresses for two vertices to be connected by an edge). However, the following issues also affect the identification of bot-user groups:

It is hard to choose a single fixed threshold of T. As shown in FIG. 4, different spamming strategies may lead to different transition points.

Bot-users from different bot-user groups may be in the same connected component. This happens due to: 1) some bot-users are shared by different spammers, and 2) a bot host computer can be controlled by different spammers.

There may exist connected components formed by normal users. For example, mobile device users roaming around different locations will be assigned IP addresses from different ASes, and therefore appear as a connected component.

To handle these problems, the present system provides a hierarchical algorithm for extracting connected components with different thresholds T, followed by a pruning and grouping procedure to remove false positives and to separate mixed bot-user groups. This algorithm is explained in the following paragraphs.

Table 1 below provides pseudo-code for the recursive function Group Extracting that will extract the connected components from the user-user graph in a hierarchical way.

TABLE 1

Recursive Function "Group_Extracting"

Procedure Group_Extracting (G, T)
Remove all the edges with weight w < T from G and suppose we get G';
Find out all the connected subgraphs $G_1, G_2, \ldots, G_k$ in G';
for i = 1 : k do
    Let $|G_k|$ > be the number of nodes in $G_k$;
    if $|G_k|$ > M then
        Output $G_k$ as a child node of G;
        Group_Extracting ($G_k$, T + 1);
    end End The initial call of Group_Extracting(G,T) is on the original user login graph and with T=2. In other words, the algorithm will first identify all the connected components with edge weight w≧2. And then within each connected component, the algorithm extracts connected components with w≧3. This recursive process repeats until the number of nodes in the connected component is less than a threshold M (M may for example be 100, but it may vary above or below that in further embodiments). The final output of the algorithm is a tree of connected components with different edge weight thresholds T.

For each connected component output by the algorithm of Table 1, the next step is to compute the level of confidence that the users in the component are indeed bot-users. In particular, the connected components involving mostly legitimate/normal users need to be removed from the tree output by the algorithm.

A major difference between normal users and bot-users is the way they send emails. More specifically, normal users usually send a small number of emails per day on average, with email sizes more uniformly distributed. On the other hand, bot-users usually send many emails per day, and many of those emails have identical or similar size, as a spam email is typically sent multiple times to different receivers with little changes. Such differences in email-sending statistics may not be able to classify a single account accurately, but is very efficient to estimate how likely the groups of users in a connected component are bot-users. To do so, for each component, two histograms may be computed from a 30-day email log:

h1: the numbers of emails sent per day by each user belonging to the component, h2: the sizes of emails.

FIGS. 5(a)-6(b) show two examples of the above two histograms, one computed from a component consisting of normal users (5(a) and 5(b)), and one from a component of bot-users (6(a) and 6(b)). The distributions are clearly different. Bot-users in a component send out more emails on average, with similar email sizes (around 3K bytes) that are visualized by the peak in the email-size histogram. Most normal users send few emails per day on average, with email sizes distributed more uniformly. The histograms may be normalized such that their sum equals to one, and two statistics, $s_1$ and $s_2$, may be computed from the normalized histograms to quantify their differences:

$s_1$: the percentage of users who send more than 3 emails per day;

$s_2$: the areas of peaks in the normalized email-size histogram, or the percentage of users who send out emails with similar size.

Since the histograms are normalized, the above two quantities are in the range of [0, 1] and are used as confidence measures. A large confidence value means that the majority of the users in the connected component are bot-users. $s_1$ is only used to choose the candidates of bot-user components, as s1 is a more robust feature. $s_2$ is used together with other features (e.g., account naming patterns) for validation purpose.

In accordance with the present system, the tree output by the algorithm of Table 1 is traversed. For each node in the tree, $s_1$ is computed. $s_1$ is the confidence measure for this node to be a component of bot-users. Since it is desirable to minimize the number of false bot-users, a conservative confidence threshold may be used to select connected components as candidates for bot-user groups. Tree nodes with confidences less than the threshold are removed from the tree.

A candidate connected component may contain two or more bot-user groups. In such case, it is desirable to decompose such a component into individual bot-user groups for various reasons:

Validation features (e.g., $s_2$ mentioned above and patterns of account user names) can be extracted more accurately from an individual bot-user group than from a mixture of different bot-user groups.

Administrators may want to investigate and take different actions on different bot-user groups based on their behavior.

Random graph model is used to select the tree nodes that contain only a single bot-user group. According to the random graph model, the user-user graph of a bot-user group should consist of a giant connected component plus very small components and/or isolated vertices. The tree is again traversed to select tree nodes that are consistent with such random graph property. For each node V being traversed, there are two cases:

V's children contain one or more giant components whose sizes are O(N), where N is the number of users in node V;

V's children contain only isolated vertices and/or small components with size of O(log(N)).

Figure 7:
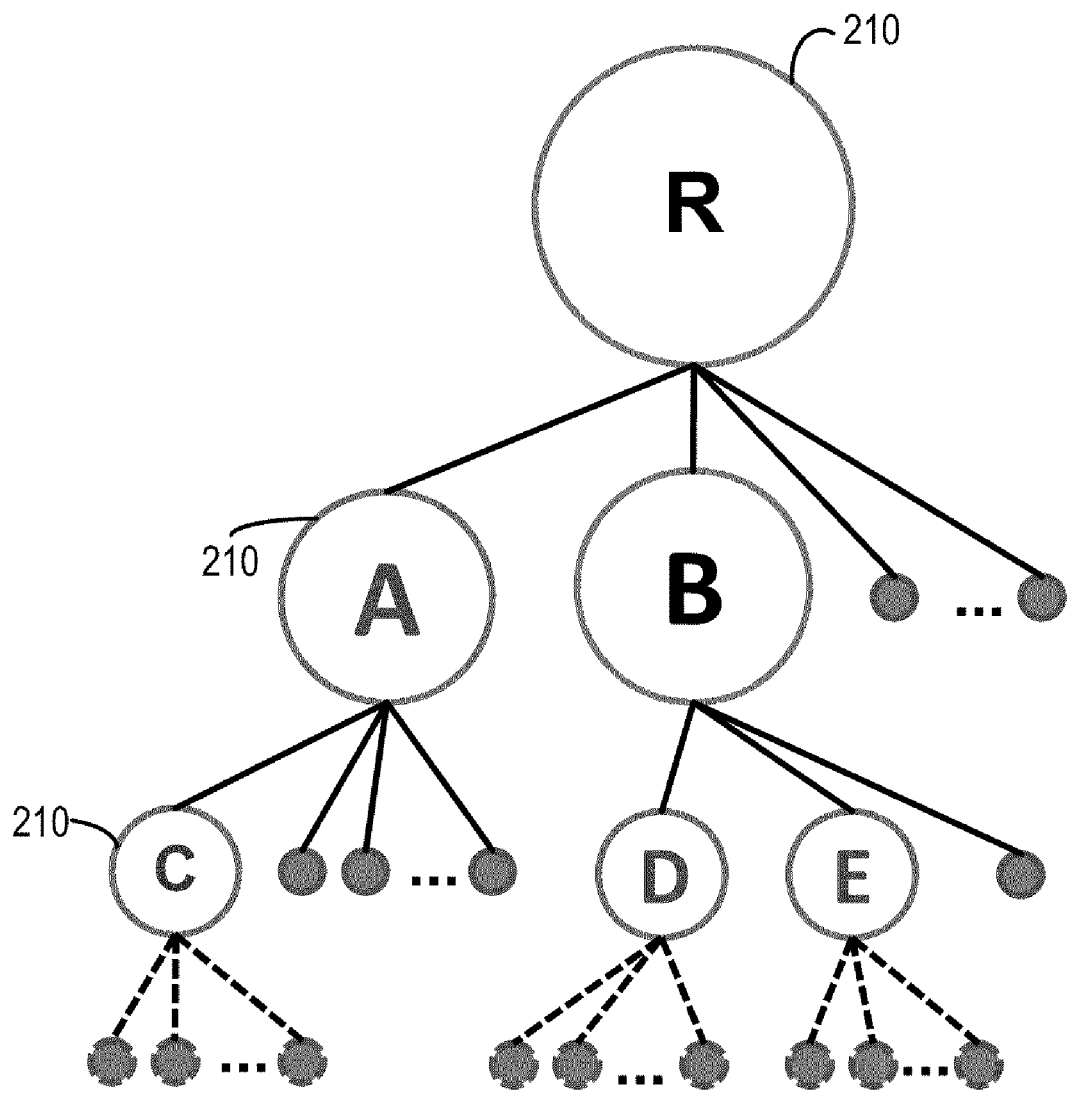
FIG. 7 shows a tree illustrating bot-user groups identified according to the present system.
Figure 9:
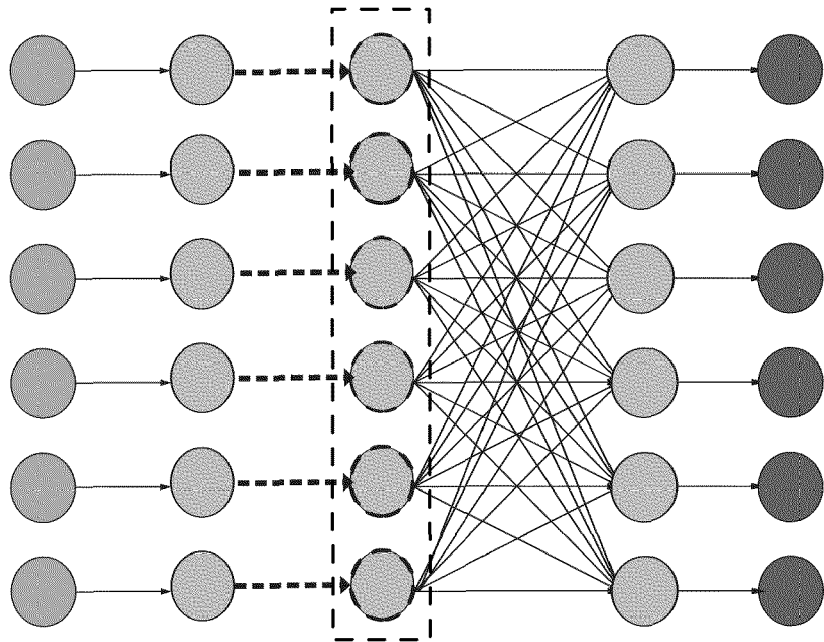
FIG. 9 is a user-user graph including user account vertices and IP address edges according to the method of FIG. 7.
Figure 8:
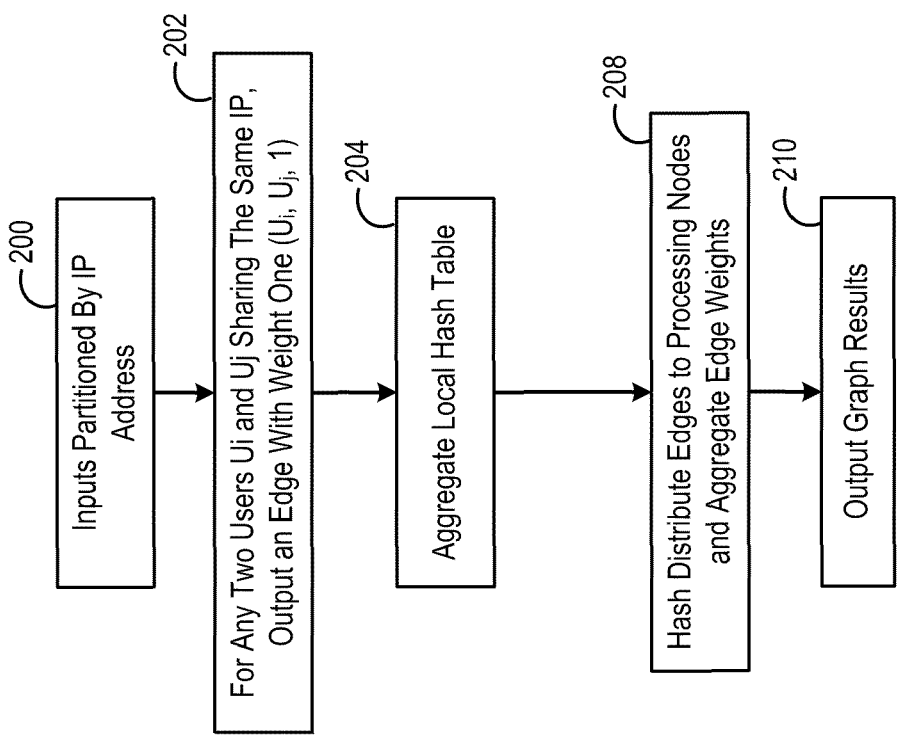
FIG. 8 is a flowchart for partitioning data by IP address.

For case 1, each subtree rooted by the giant components is recursively traversed. For case 2, traversal is stopped for the subtree rooted at the V. FIG. 7 illustrates the process including a plurality of nodes 210. In FIG. 7, the root node R is decomposed into two giant components A and B. B is further decomposed into another two giant components D and E, while A is decomposed into one giant component C. The giant component disappears for any further decomposition, indicated by the dash-lines. According to the theory, A, C, D, and E are bot-user groups. If a node is chosen as a bot-user group, the sub-tree rooted at the chosen node is considered belonging to the same bot-user group. That is, if A is picked, its child C is disregarded as it is already contained in A.

The following describes large graph construction using the above-described computer cluster. Both the history-based anomaly detection and the user-user graph based botnet detection require processing of a large amount of log data. For example, the signup log for Hotmail® web-based e-mail service is on the order of 10 GB per month and the login data for Hotmail® web-based e-mail service is on the order of 200-250 GB per month. Thus, it is impossible to fit input data into memory for the required computation. Furthermore, the amount of data is increasing as the Hotmail® user population grows. However, when an attack is going on, it is desirable to be able to detect it as early as possible to take reactive measures in time. As discussed above, models capable of carrying out the required computations of the present system are the Dryad and DryadLINQ models, which have advantages in data scalability and efficiency. However, as indicated above, other parallel processing models are contemplated.

Since the history based anomaly detection can be performed independently based on each IP address, its implementation is straightforward: the signup data is partitioned based on IP address so that all the signup records corresponding to an IP are located in one partition. Dryad and DryadLINQ may then be used to process all data partitions in parallel across multiple computers.

One challenge is to construct a user-user graph using the raw Hotmail® login records as input. Here, each input record contains three pieces of information: UserID, IP address, and the login timestamp. The outputs of the graph construction are a list of edges in the format of UserID1, UserID2, and the weight. The existence of bot-users make the graph both large and dense, requiring the computation of the edge weights of all pair-wise users. The following paragraphs set forth the design considerations for large-scale graph construction on top of distributed computing infrastructures. Two alternatives are described that build upon different strategies of data partitioning. The first alternative is partitioning by IP address. The second alternative is partitioning by user ID.

When partitioning by IP addresses, all the user records associated with the same IP address are put into the same data partition. The Map and Reduce operations from the MapReduce framework may then be used to process all the partitions in parallel. This converts the graph construction problem into a data-parallel application. Such a process flow will now be described with reference to the flowchart of FIG. 8 and the user-user graph of FIG. 9. Initially, data is partitioned according to IP address in step 200. During the Map phase (steps 202 and 204), for any user $U_i$ and $U_j$ sharing the same key IP-day from $AS_k$, an edge with weight one is output in the format of ($U_i$, $U_j$, $AS_k$). To efficiently compute all pair-wise user weights from one partition, a local hash table may optionally be kept with keys on IP-day as an optimization (step 204). To ensure the hash table can fit into memory, each data partition size should be small. In embodiments, only edges with weights originated from different ASes need to be returned.

After the Map phase, all generated edges (from all partitions) will serve as input to the Reduce phase. In particular, all edges will be hash distributed to a set of processing nodes for weight aggregation using ($U_i$, $U_j$) tuples as hash keys (step 208). For those user pairs that only share one IP-day in the entire dataset, there is only one edge between them. Therefore, no aggregation can be performed for these weight one edges. As discussed below with respect to FIG. 12, weight one edges are the dominate source of graph edges. The algorithm of the present system may therefore focus on only edges with weight two and above. In step 210, the output of the Reduce phase are graph edges with aggregated weights.

With data partitioning, a large part of the complexity comes from system I/O, including disk access and network communication of intermediate results (i.e., locally generated edges for aggregation). Table 2 defines the parameters used for analyzing the cost.

TABLE 2

Parameter definitions for complexity analysis.

| Term | Description |
| --- | --- |
| n | number of input tuples (user, IP, timestamp) |

TABLE 2-continued

Parameter definitions for complexity analysis.

| Term | Description |
|---|---|
| $l_i$ | number of graph edges with weight i |
| w | minimum edge weight in the constructed graph |
| m | number of input data partitions |
| $r_{ij}$ | number of records sent from partition $P_i$ to partition $P_j$ as intermediate results |

During step 202, all input data are read only once (n records in total) for processing. Step 210 outputs graph edges with a weight greater than or equal to a threshold w, so the number of output records are $\Sigma_{i \geq w} l_i$. Both the inputs and outputs are considered as local I/O cost (assuming final results are not aggregated back into one machine). From step 202 (and optionally the optimization step 204) to step 210, there exists a large number of edges to ship across different processing nodes. At worst, it is assumed that edge weights cannot be aggregated locally, hence the total number of edges involved in cross-node communication is $\Sigma_{i \geq 1} l_i \times i$.

In terms of computation complexity, during step 202, each IP-key pair is first put into a local hash table with O(1) complexity, so the cost is $(O(n)+O(\Sigma_{i \geq 1} l_i \times i))$. At step 204, the computation cost is linear to the intermediate output size, so the overhead is roughly $O(\Sigma_{i \geq 1} l_i \times i)$. At final aggregation step (step 208), for each edge $(U_i, U_j, AS_k)$, it is stored in another hash table with O(1) complexity and all such edges are later summed according to the user-user pairs, so the cost is $O(\Sigma_{i \geq 1} l_i \times i)$. Summing everything up, the total computation complexity is $O(n)+O(\Sigma_{i \geq 1} l_i \times i)$.

As indicated above, an alternative approach is to partition the inputs based on user ID. In this way, for any two users that were partitioned in the same location, the IP-day lists of them can be compared directly to generate the corresponding edge weight. However, for two users whose records are located at different partitions, one user's records need to be transferred to another user's partition before computing their edge weight. This results in significant communication costs. However, for users who do not share any IP-day keys, such communication costs can be potentially avoided. Specifically, the communication overhead may be reduced by selectively filtering data and distributing only the related records across partitions.

Figure 10:
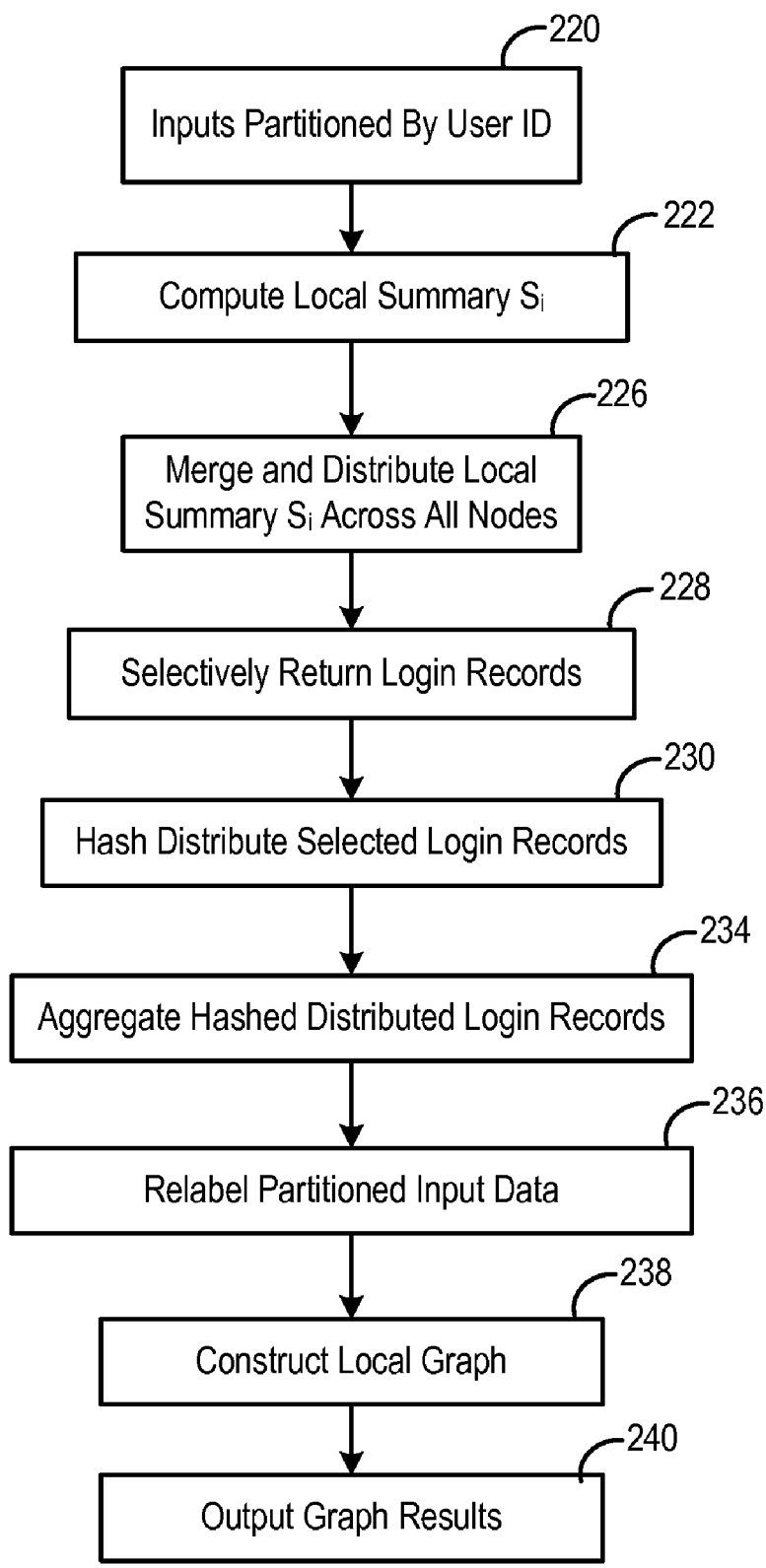
FIG. 10 is a flowchart for partitioning data by user ID.
Figure 11:
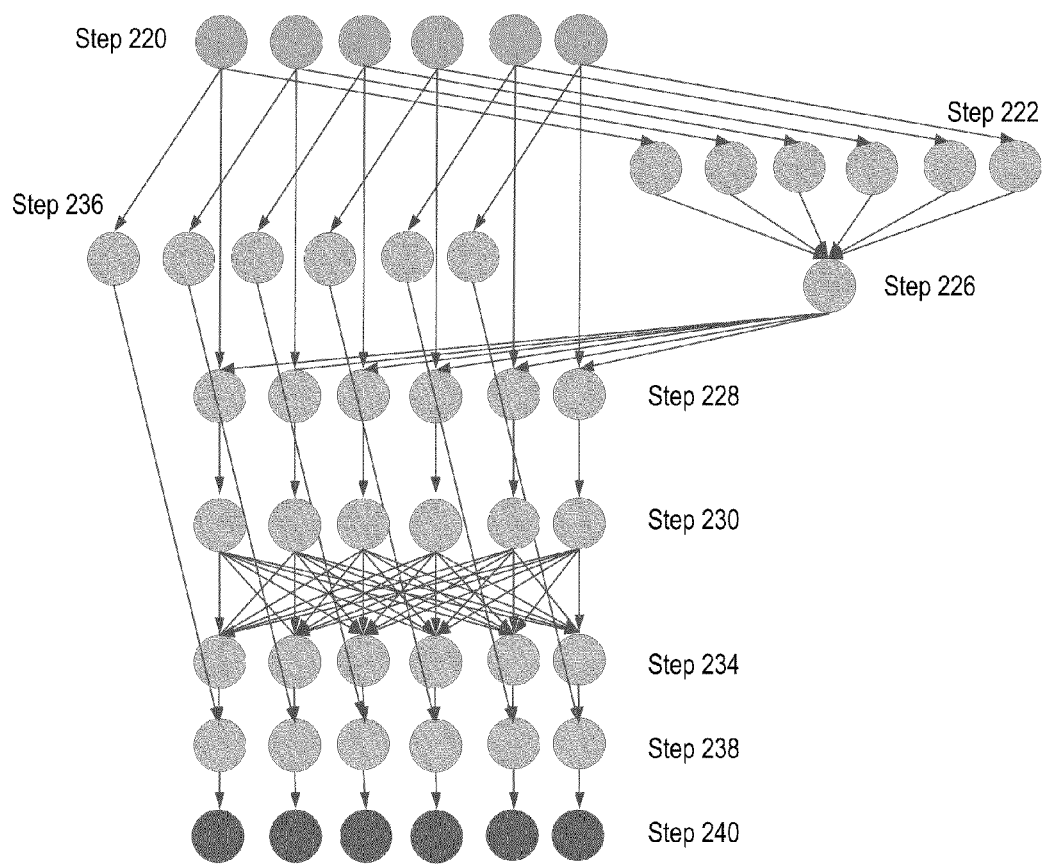
FIG. 11 is a user-user graph including user account vertices and IP address edges according to the method of FIG. 10.

FIG. 10 is a flowchart showing the processing flow of generating user-user graph edges with such an optimization. FIG. 11 is a user-user graph showing the steps of FIG. 10. The data is partitioned in step 220. For each partition $p_i$, the system then computes a local summary $s_i$ in step 222 to represent the union of all the IP-day keys involved in this partition. Each local summary $s_i$ is then merged and distributed across all nodes in step 226 for selecting the relevant input records. At each partition $p_j$ (j≠i), upon receiving $s_i$, $p_j$ will return all the login records of users who shared the same IP-day keys in $s_i$. This step 226 can be further optimized based on the edge threshold w. That is, if a user in $p_j$ shares fewer than w IP-day keys with the summary $s_i$, this user will not eventually result in edges with weight at least w. Thus only the login records of users who share at least w IP-day keys with $s_i$ can be selected and sent to partition $p_i$ (step 226). In step 228, the system selectively returns login records, and the selected records are hash distributed in step 230. In step 234, the hashed distributed login records are aggregated, and the partitioned input data is relabeled in step 236. Finally, after partition $p_i$ receives the records from partition $p_j$, it joins these records with its local copy of records to generate graph edges (step 238) to provide the final graph (step 240).

In terms of computation complexity, both the input and output size of this method remains the same as method 1, so the local I/O cost is $O(n+\Sigma_{i \geq w} l_i)$. The communication cost with a local summary is $O(\Sigma s_i \times m+\Sigma_{i,j} r_{i,j})$, where $s_i$ is the local summary size and $r_{ij}$ are the amount of data sent from partition $p_i$ to partition $p_j$. The computation cost is $O((n/m)^2)$, where n/m is the size of partition. The overall computation cost is $O(n^2/m)$ over all partitions. Table 3 shows the comparison between method 1 (partition by IP address) and method 2 (partition by user ID).

TABLE 3

Complexity comparison between Method 1 and 2.

| | Method 1 | Method 2 |
|---|---|---|
| Local I/O | $n + \Sigma_{i \geq w} l_i$ | $n + \Sigma_{i \geq w} l_i$ |
| Communication | $\Sigma_{i \geq 1} l_i * i$ | $\Sigma S_i * m + \Sigma_{i,j} r_{ij}$ |
| Computation | $O(n) + O(\Sigma_{i \geq 1} l_i * i)$ | $O((n/m)^2)$ |

Figure 12:
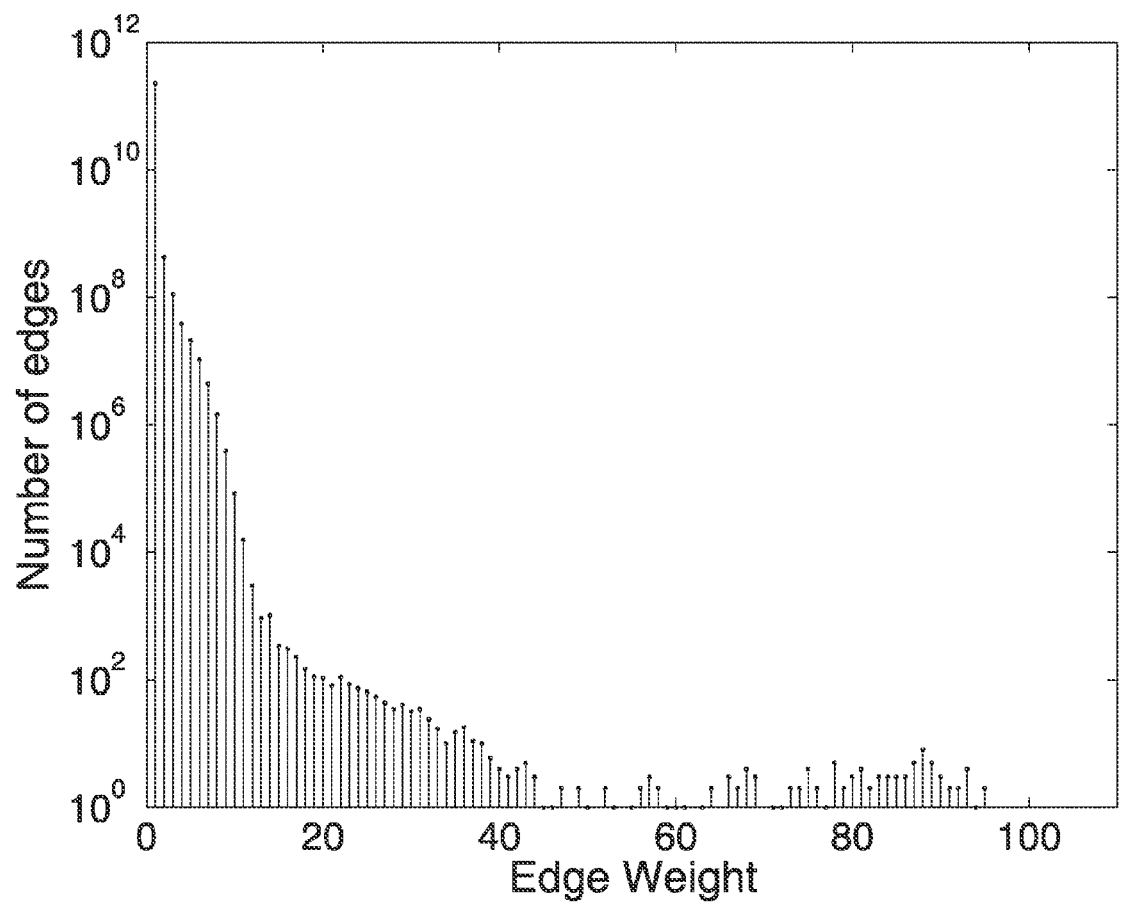
FIG. 12 is a graph of edge weight distribution showing the number if IP address edges versus edge weight using a month of user log in data.

In comparing method 1 to method 2, the main difference is that method 1 generates edges of weight one and sends them across the network at the reduce phase, while method 2 directly computes edges with weight w or more. FIG. 12 shows the distribution of edge weights using one month of user login records as input. As is shown, the number of weight one edges is two orders of magnitude more than the weight two edges. In the botnet detection of the present system, edges with a minimum weight two are of interest because weight one edges do not show strong correlated login activities between two users. Therefore the computation and communication spent on generating weight one edges is not necessary. Although in method 1, step 204 (optional) can do some local aggregation to reduce the number of weight one edges, it does not eliminate them entirely because each partition has only a local view.

Furthermore, existing distributed computing models such as MapReduce and DryadLINQ all adopt disk read/write as cross-node communication channels. Using disk access as communication is robust to failures, and is also simple if built on top of distributed file systems. However, when the communication cost is large such as in the present case, the overall system performance will be impacted significantly due to a large amount of data for disk read/write. Cross-node communication may be a dominant factor of the overall system running time.

Finally, the cross-node communication costs also depend on the scale of the computer cluster. With a larger number of computers, the communication overhead of method 2 also increases, while method 1 will result in constant communication overhead.

As indicated above, in one embodiment, the above-described method 1 and method 2 may be implemented on a cluster of nine networked computers, though the number of computers in the cluster may be more or less in alternative embodiments. Given that method 2 outperforms method 1, the following results are presented using method 2 only.

Login data for a typical webmail service such as Hotmail® is on the order of hundreds of Gigabytes. Therefore, in embodiments, the input data may be pre-filtered to further reduce the data scale. One option is to pre-filter users by their login AS numbers. If a user has logged in from IP addresses across multiple ASes in a month, this user may be regarded as a suspicious user candidate. By choosing only suspicious users (using for example five ASes as the threshold) and their records as input, the amount of data to be processed may be significantly reduced. With such a pre-filtering process, the number of users to consider may be reduced by an order of magnitude to about 40 million. It is understood that the pre-filtering process may be omitted in alternative embodiments.

To make the data even more compact and reduce the communication overhead, the various fields may be re-coded by reducing the number of bits required to represent each record. Before encoding, general or proprietary compression techniques can be applied to the data set to reduce its size. In one example, each user ID is represented using a 64 bit integer, and a timestamp requires 64 bits as well. Through recoding, the size of the data may be reduced to 32 bits for encoding a User ID and 8 bit to encode the timestamp in terms of dates. Using both pre-filtering and compression, the input data volume may be reduced from 200-240 GB to about 10-15 GB. The re-coding step may be omitted in alternative embodiments.

All the input login records may be hash distributed evenly to the computers within the cluster using the DryadLINQ built-in hash-distribute function. The local summary generation and user record selection both require the system to be able to index partitions (step 222 and 226 of method 2). To do so, a one-byte label may be added to each record. This requires re-labeling of the input data. Another reason for re-labeling data is to be able to leverage DryadLINQ's support of defining operations on two heterogeneous data sources. In particular, given two data sources X and Y, each divided as n partitions $x_1, x_2, \ldots, x_n$ and $y_1, y_2, \ldots, y_n$, DryadLINQ supports defining a function $f(X,Y)$ that runs function f on pair-wise data $(x_i; y_i)$. This simplifies programming without having to be concerned about the detailed execution plans on data across different processing nodes. In embodiments, X represents the original login records, Y represents the selected login records, and a label may be used to match them for constructing graphs.

Two other techniques can further help to reduce the communication costs and latency: parallel data merge and general compression techniques. In the second method, the IP-day summaries generated from every node need to be merged and then broadcasted to the entire cluster. The default query is to have a single node that performs data aggregation and distribution. In our experiments, this aggregating node becomes a big bottleneck, especially when the computer cluster size is large. So instead of using the default query plan, this step can be optimized with a new query plan that supports parallel data aggregation and distribution from every processing node. This optimization can reduce the broadcast time by 4-5 times. The use of general compression (e.g., gzip) can reduce the communication data size by 2-3 times and reduce the total latency by about 15-25%.

Figure 13A:
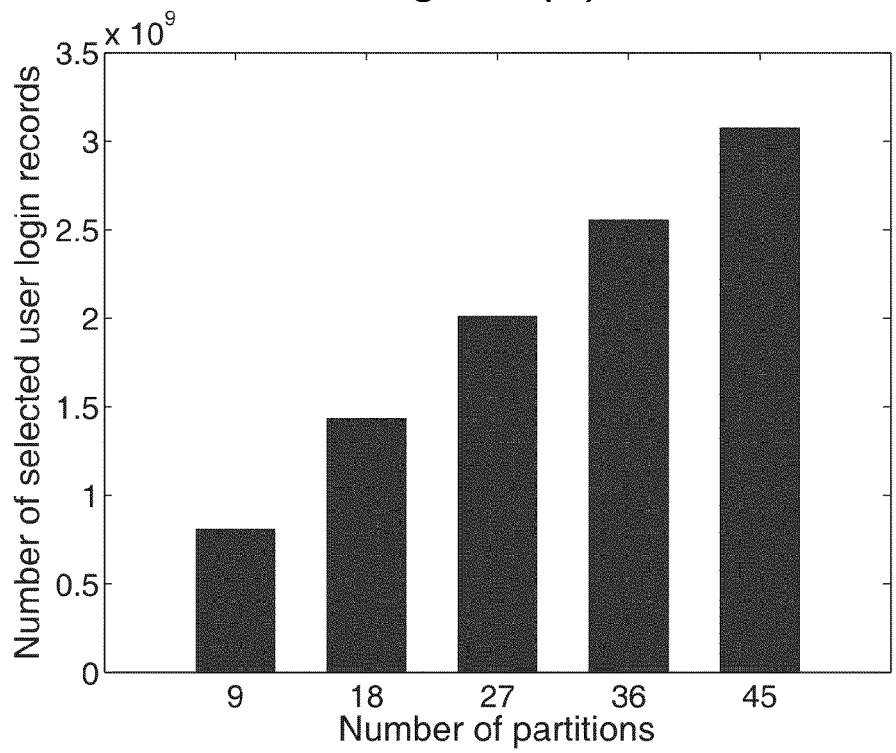
FIG. 13(a) is a graph of communication data size showing a variation in the number of selected user login records as the number of input data partitions are varied.
Figure 13B:
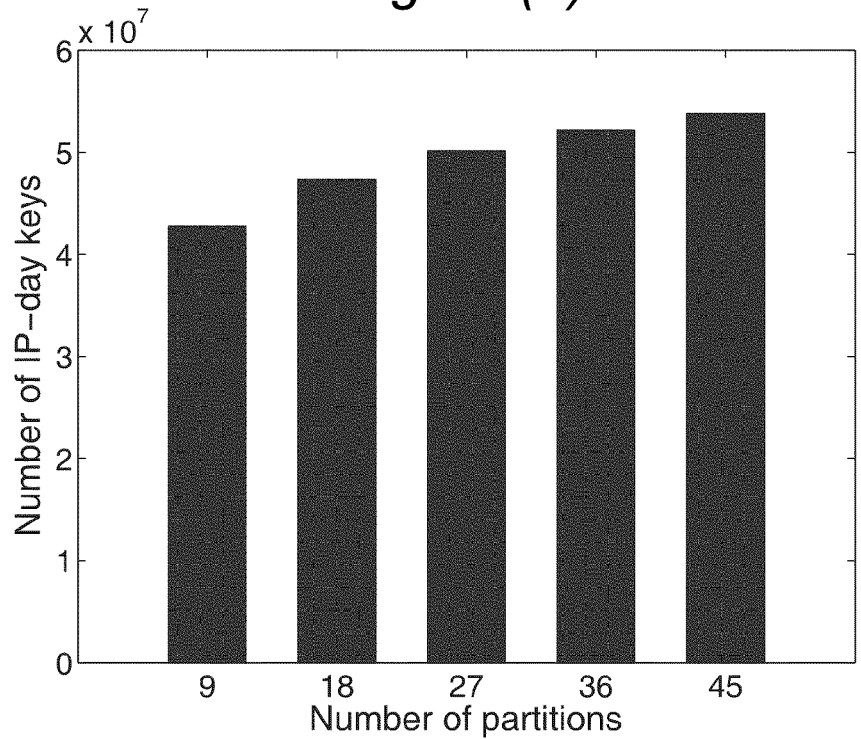
FIG. 13(b) is a graph of the total number of selected user login records sent between partitions.

FIGS. 13(a) and 13(b) show the communication overheads as the number of partitions are varied. As expected, when the number of partitions are increased, the overhead increases linearly since the same set of IP-day keys will be scattered across more partitions and sent multiple times. Accordingly, the same login records will also be shipped across more nodes, increasing the communication costs.

Figure 14A:
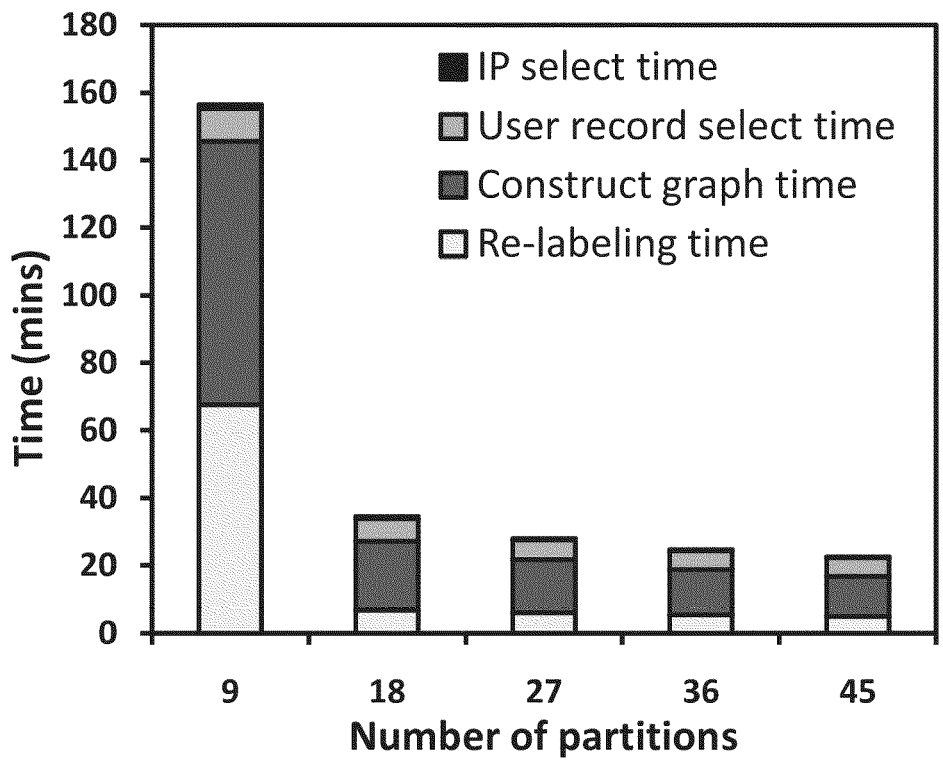
FIG. 14(a) is a graph of running time showing the variation in run time as the number of input data partitions are varied.

While the communication costs increase with more partitions, the total running time at each partition decreases by each one handling less amount of data overall. FIG. 14(a) shows the running time at each partition, broken down to different operation steps. The majority time is spent constructing graphs. Selecting user records and re-labeling data also takes a significant portion time, mostly because these two operations use disk writes as the communication methods in the current Dryad/DryadLINQ framework. The running time dropped from 9 partitions to 18 partitions but has diminished return after that.

Figure 14B:
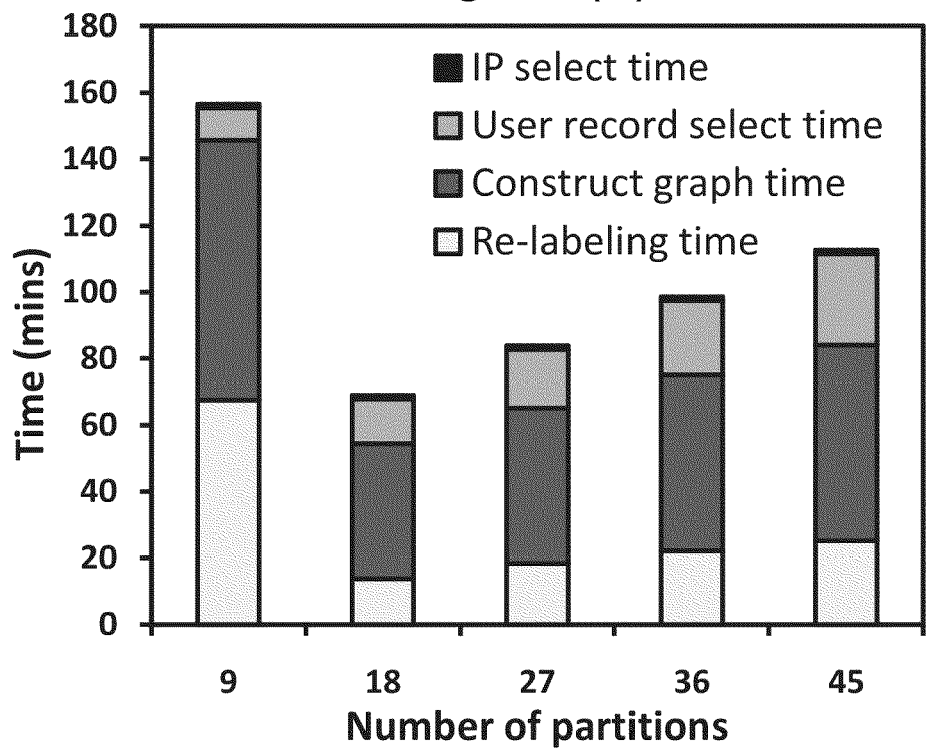
FIG. 14(b) is a graph of the total running time of all partitions.

Ideally, such decreasing computation time in FIG. 14(a) is what is expected with larger clusters of more computers. In practice, FIG. 14(b) shows the total running time with different input data partitions on a 9-machine cluster. In this case, it was experimentally determined that the system total run time increased when the number of partitions further increased beyond 18. This is because with 9 machines, each machine processed multiple partitions sequentially. So the total time is the sum of the time spent in processing all the partitions on one single computer. Even in this case, 18 partitions still yield the best performance. This number will vary depending on the dataset and hardware configuration; however the same local minimum phenomena will be present.

Even after data pre-filtering by user AS numbers, the constructed graph is still large, mostly because the selected users have a high chance of being bot users and their resulting graph is dense, involving hundreds of gigabytes of edges (e.g., 240 G for a graph generated using one month's data). Given the large communication overhead involved in constructing such dense graphs, one potential optimization technique is to strategically partition the login records. Ideally, users can be pre-grouped so that users who are heavily connected together can be placed in one partition, and users who are placed in different partitions have very few edges between them. If so, step 226 in method 2 will return only a small number of records to ship across different nodes. Contrary to expectations, it was found that this strategy induced negative impact on performance.

Figure 15A:
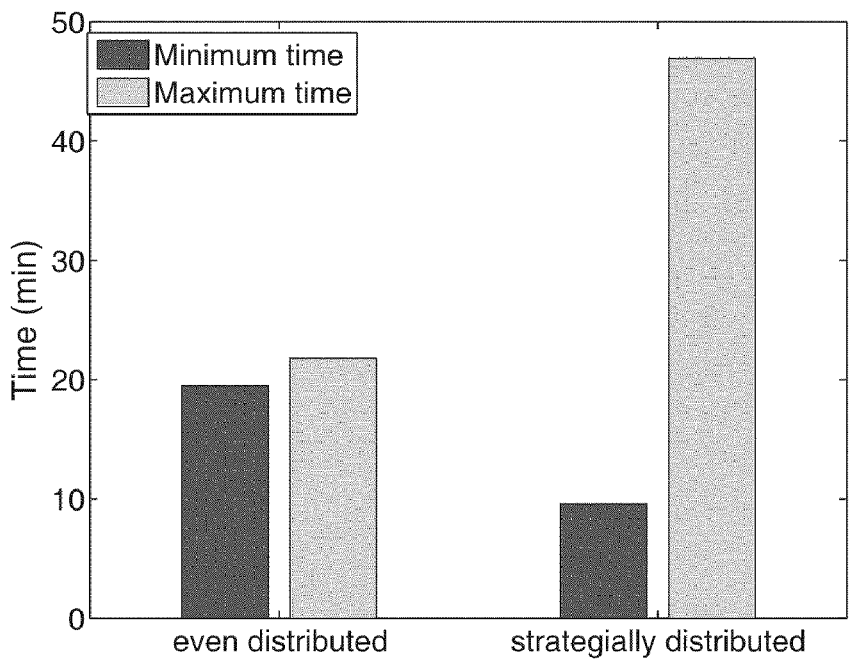
FIG. 15(a) is a graph of the maximum and minimum running time of all partitions spent in generating the edges between vertices.

FIG. 15(a) shows the graph construction time spent at a processing node with and without strategic data partitioning. The 18 input data partition scenario was chosen because it yields the best overall performance in the cluster. In the first case, a large bot-user group was chosen with 3.6 M users and put all their login records evenly across 6 partitions. The rest of the input data were then evenly distributed across the remaining 12 partitions. This scenario assumes the best prior knowledge of user connections. In the second case, the login records were evenly distributed by hashing user IDs. For each case, FIG. 15(a) shows the maximum and minimum time across all the 18 nodes spent on the edge generation step, which is the most expensive step in graph construction. From FIG. 15(a) it can be seen that, with strategic partitioning, there is a large difference between the minimum and maximum node processing time, while the evenly distributed data resulted in balanced load across nodes. Correspondingly, the total running time with strategic data partitioning is around 81 minutes, 12 minutes longer than using evenly partitioned inputs.

Figure 15B:
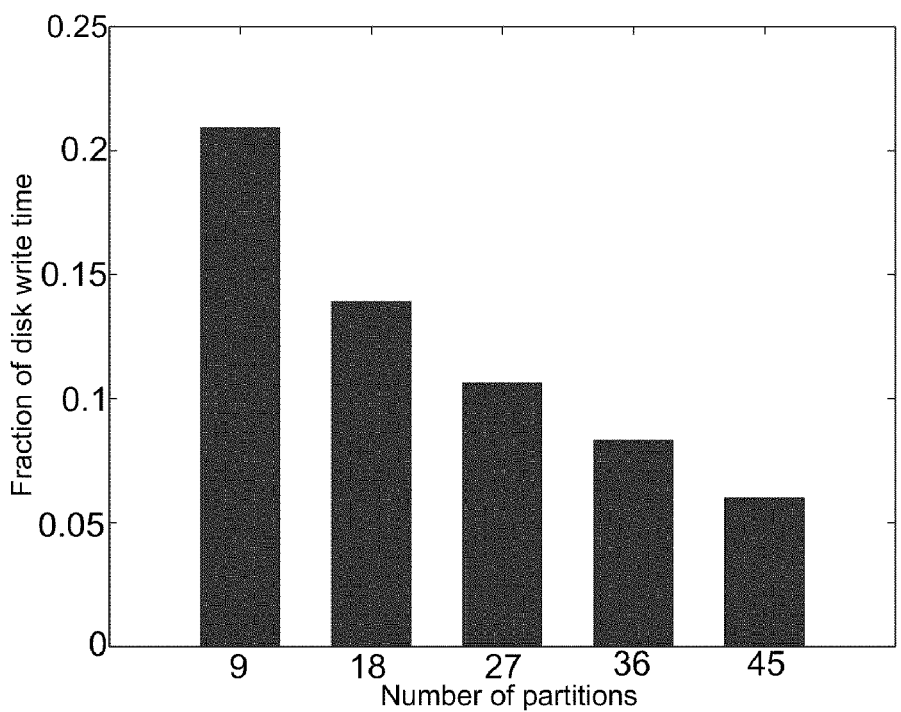
FIG. 15(b) is a graph of the fraction of disk write time spent in the user record selection step.

The DryadLINQ framework supports only using disk read/write as communication channels, which may become a performance barrier for communication intensive applications. In step 226 of user login record selection, a dominant factor is disk write time as shown in FIG. 15(b). A more performance efficient way is to set up TCP pipes between processing nodes and streaming data between different processing stages.

In the current Dryad/DryadLINQ framework, the communication is based on the unicast model, though other models, such as broadcast and multicast may be used in further embodiments. For example, using 45 data partitions located on 9 machines (5 partitions each), the system sends 5 copies of the local summary of a partition to each machine instead of one copy. The current redundant data transfer comes from the fact that the distributed infrastructure does not know application semantics and hence can not tell whether the data segment transmitted to different nodes are the same or not.

The above paragraphs have described a graph-based system for detecting bot-user accounts by examining IP addresses. In particular, a graph is constructed where an edge between any two vertices indicates that the user accounts represented by the vertices share at least one IP address. A weight is assigned to each edge, depending on the number of IP addresses shared between the corresponding user accounts. In further embodiments, the present system may construct a graph having edges between vertices defined by user account characteristics other than, or in addition to, IP addresses.

For example, the present system may construct a graph where two or more vertices are connected by an edge when the corresponding user accounts have the same account signup time (or have signup times within a predetermined period of time of each other). As a further example, a graph may be constructed where an edge between any two vertices indicates that the user accounts represented by the vertices shared the same IP address during account signup. As a still further example, the present system may construct a graph where two or more vertices are connected by an edge when the corresponding user accounts have the same or similar account signup information. Such information may include the two user accounts having users from the same country code, the same zip code, the same or similar user name patterns, similar signup interfaces, etc. Still other user account characteristics which may create an edge between two or more vertices on the user-user graph include:

- login behavior, such as whether emails are sent each time a user logs in, or whether the user receives or reads incoming emails, etc.
- email send behavior, such as the similarity between two or more user accounts of the number of emails sent, email sizes, whether the emails have attachments, the inter-email sending time, etc.
- account information, such the similarity of the number of folders, the size of the inbox, the size of outbox, the size of contact list, whether the user has signed up to mailing lists, etc.

Other account characteristics may also be used as described above.

In addition to or instead of using the above-described user account characteristics in constructing a user-user graph, at least some of these account characteristics (including IP addresses from where emails are sent) may be used in the above-described historical-based approach for detecting anomalous changes in user account information. They may be further incorporated in schemes where, for instance, these factors are taken into account via the weight of graph edges.

The above description sets forth a two-prong approach to detecting bot-user groups. The first prong employs a historical-based approach for detecting anomalous changes in user account information. The second prong employs construction of a user-user graph which allows extraction of connected components with different thresholds. It is understood that the present system may operate only by the second prong, where the historical approach is omitted, in alternative embodiments.

The follow paragraphs set forth an example of tests that were performed to validate the method of the present system for detecting bot-user groups.

EXAMPLE

Two datasets were used as input to the system. Both datasets were collected over a period of one month: the first data set was collected in June, 2007, and the second data set was collected in January, 2008. Each dataset consists of two logs: a user signup log for Hotmail® web-based e-mail service and a user login log Hotmail® web-based e-mail service. Each record in the user signup log contains a user-ID, the remote IP address used by the user to connect to the webmail service, and the signup timestamp. Similarly, each record in the user login log contains a user-ID, the remote login IP address, and the login timestamp.

For each dataset, the EMWA-based anomaly detection scheme was run on the user signup log to detect bot IP addresses that were used to aggressively sign up new accounts. The graph based detection scheme was also run on the user login log to identify tightly connected bot-user accounts and their IP addresses. The results are set forth below.

With regard to detection using signup history, Table 4 shows that the EWMA algorithm detected 21.2 million bot-user accounts when applied to the two Hotmail user signup logs.

TABLE 4

History based detection of bot IP addresses and bot-user accounts.

| | Month | |
|---|---|---|
| | June 2007 | January 2008 |
| # of bot IPs | 82,026 | 240,784 |
| # of bot-user accounts | 4.83 M | 16.41 M |
| Avg. anomaly window | 1.45 day | 1.01 day |

The bot-user IDs of both months were compared and it was found that relatively little overlap occurred with each other. In fact, many of the bot-users of June, 2007 were already deleted from the system due to their spamming history. Comparing June, 2007 with January, 2008, both the number of bot IP addresses and the signed-up bot-user accounts increased significantly. In particular, the total number of signed-up bot-user accounts in January, 2008 is more than triple that of June, 2007. Meanwhile, the anomaly window shortened from an average of 1.45 days to 1.01 days, suggesting the attacks became shorter in January, 2008.

Figure 16A:
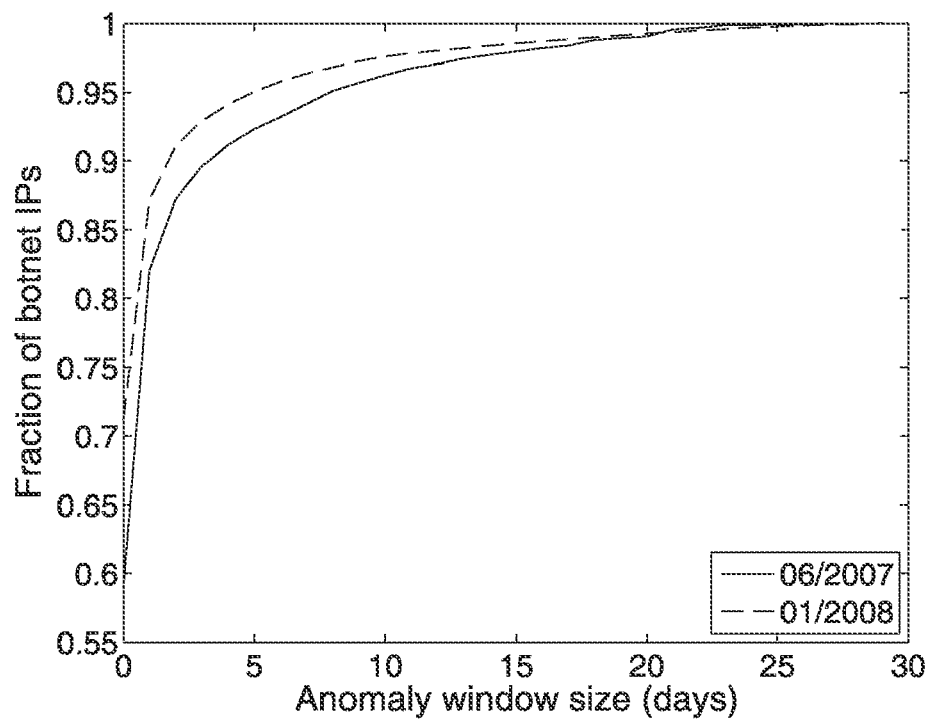
FIG. 16(a) is a graph of the cumulative distribution of the anomaly window sizes associated with each bot IP address.

FIG. 16(a) shows the cumulative distribution of the anomaly window sizes associated with each bot IP address. The majority (80%-85%) of the detected IP addresses have small anomaly windows, ranging from a few hours to one day. This suggests that the botnet-controlled signup attacks happened in a burst at most of the zombie hosts.

Figure 16B:
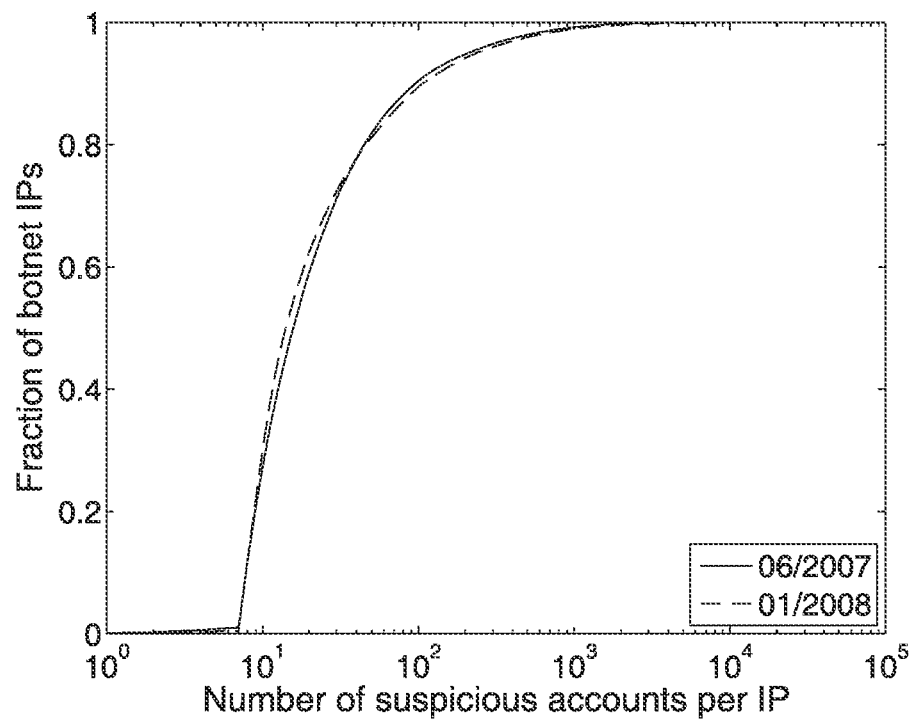
FIG. 16(b) is a graph of the cumulative distributions of the number of accounts signed up per bot IP address.

FIG. 16(b) shows the cumulative distributions of the number of accounts signed up per bot IP address. As shown, the majority of bot IP addresses signed up a large number of accounts, even though most of them have short anomaly windows. The cumulative distributions derived from June, 2007 and January, 2008 overlap well with each other, although a much larger number of bot IP addresses and bot-user accounts were observed in January, 2008. This suggests that the overall bot-account signup activity patterns still remain similar, perhaps due to the relative small number of bot-account signup tools/software.

With regard to detection by user-user graph, the user graph algorithm may be applied on the user login log for Hotmail® web-based e-mail service to derive a tree of connected components. Each connected component is a potential set of bot-users. The results are then pruned, using the above-described techniques of pruning connected components of normal users. In that pruning process, a threshold is applied on the confidence measure of each component (computed from the "email-per-day" feature) to remove normal user components. The confidence measures are well separated: most of the bot-groups have a confidence measure close to 1, and a few groups are between 0.4 and 0.6. A wide margin can be seen around confidence measure of 0.8, which was chosen as the confidence threshold, since it is high enough and the wide margin makes it insensitive to noises in confidence measures. That is, for any group that has a confidence measure below 0.8, it is regarded as a normal user group and pruned from the tree.

Table 5 shows the final detection results after pruning.

TABLE 5

Bot IP addresses and bot-user accounts detected by user-user graphs.

|  | Month | |
| --- | --- | --- |
|  | June 2007 | January 2008 |
| # of bot-groups | 13 | 34 |
| # of bot-accounts | 2.66M | 5.96M |
| # of unique IPs | 2.69M | 6.34M |

Both the number of bot-users and the number of bot IP addresses are on the order of millions—a non-trivial fraction of all the users and IP addresses observed by Hotmail®. Similar to the EWMA detected ones, the bot-users detected in two months hardly overlap with each other.

From the table, it can be seen that these accounts were quite stealthy and sent only a small amount of spam emails during the month, making them hard to capture using the simple rate-limiting based approach. Detecting and sanitizing these users are important both to save Hotmail® resources and to reduce the amount of spam sent to the Internet.

Comparing January, 2008 with June, 2007, the number of bot-users doubled, suggesting that using web portal resource as spamming media has become more popular now. Similarly, the number of spam emails also doubled from June, 2007 to January, 2008, yet the number of bot-IPs increased slightly more slowly. Thus each bot IP address was being used more aggressively in January, 2008.

Figure 17A:
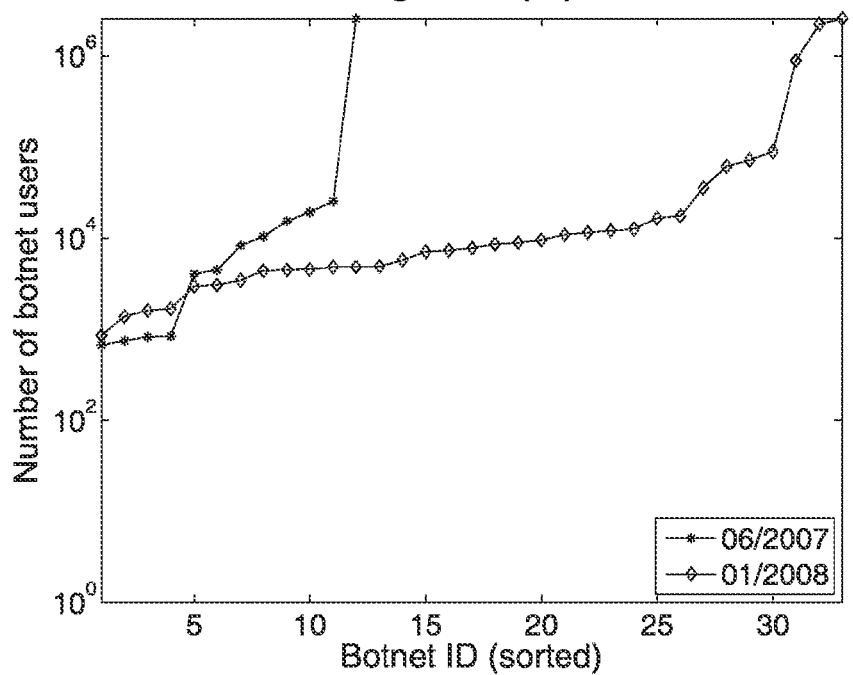
FIG. 17(a) is a graph showing the number of users involved in each bot-user group.
Figure 17B:
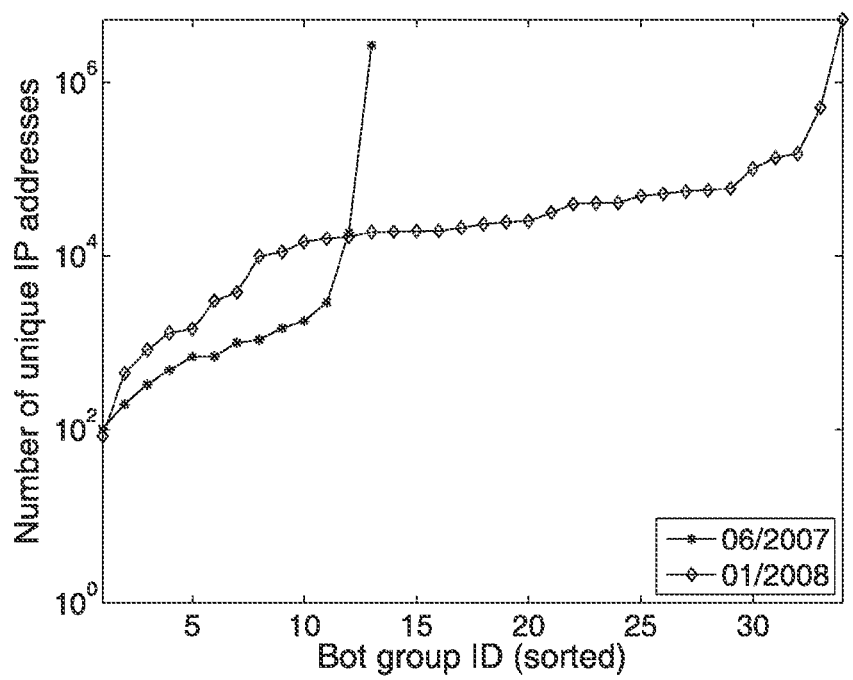
FIG. 17(b) is a graph showing the number of IP addresses used by each bot-user group.

FIG. 17(a) shows the number of users involved in each bot-user group, ranging from thousands to millions in the largest group. Although less botnet groups were detected in June, 2007 than in January, 2008, the biggest bot-user group remains similar in size. FIG. 17(b) shows the number of IP addresses used by each bot-user group. In June, 2007, the median number of bot IP addresses per group is about several thousand. The corresponding value of January, 2008 is an order of magnitude larger.

Combining the results of both the history-based detection and the user-user graph based detection, the present system was able to detect tens of millions of bot users and millions of botnet IP addresses. Table 6 shows the summarized results for both months. In particular, the botnet IP addresses detected is by far a much larger set compared with the results from many previous research efforts.

TABLE 6

Total Bot users and Bot IP addresses detected.

|  | Month | |
| --- | --- | --- |
|  | June 2007 | January 2008 |
| # of bot-users | 5.97M | 21.58M |
| # of bot-IPs | 2.71M | 6.48M |

Once spamming bots and bot users are detected, operators can take remedial actions and mitigate the ongoing attacks. For bot users, operators can block their accounts to prevent them from further sending spam. For detected bot IP addresses, one approach is to blacklist them or rate limit their login activities, depending on whether the corresponding IP address is a dynamically assigned address or not.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. A computer-readable storage medium for programming a processor to perform a method for detecting bot-user accounts on a web-based email system, the method comprising:
    a) determining a group of seed accounts that are potentially bot-user accounts, said step of determining comprising the step of examining a number of user account signups within a predefined period of time to detect an anomaly in the changes in the user account data;
    b) examining a degree to which the seed and other candidate accounts share the same IP addresses when sending emails, said step of examining comprising the step of constructing a graph wherein the vertices are user accounts and two vertices are connected by an edge if the corresponding two user accounts share at least one IP address within a predefined period of time; and
    c) identifying bot-user accounts on the web-based emails system based on the results of said steps a) and b).

2. The computer-readable storage medium of claim 1, wherein two or more user accounts sharing a threshold number of computers within a predefined period of time is indicative of a bot-user group.

3. The computer-readable storage medium of claim 1, further comprising the step of assigning a weight to an edge between any pairs of vertices, the weight of an edge between a pair of vertices representing one or more of the following: i) the number of computers shared between the corresponding two user accounts, and ii) shared characteristics including at least one of login time, signup date and sending patterns.

4. The computer-readable storage medium of claim 3 wherein a disproportionate drop off in the amount of connected vertices from one weight to the next successive weight indicates one or more bot-user groups at the lower weight.

5. The computer-readable storage medium of claim 4, further comprising examining the one or more bot-user groups identified at the lower weight to determine how many bot-user groups are in the one or more identified bot-user groups.

6. The computer-readable storage medium of claim 1, further comprising the step of pruning the results obtained in said step c) to remove accounts that were falsely indicated to be bot-user accounts.

7. The computer-readable storage medium of claim 6, wherein the step of pruning the results comprises at least one of the following: i) examining the size of emails sent from different user accounts in a suspicious group of user accounts, with email sizes more uniformly distributed indicating that the accounts in the group are less likely to be bot-user accounts, ii) examining the number of emails per day sent from different user accounts in a suspicious group of user accounts, with the number of emails less uniformly distributed indicating that the accounts in the group are less likely to be bot-user accounts, and iii) examining the login times of different user accounts in a suspicious group of user accounts, with the login times less uniformly distributed indicating that the accounts in the group are less likely to be bot-user accounts, and iv) examining the signup date of different user accounts in a suspicious group of user, with signup dates less uniformly distributed indicating that the accounts in the group are less likely to be bot-user accounts.

8. The computer-readable storage medium of claim 1, further comprising the step of examining similarities between user accounts to determine an existence of bot-user accounts by examining at least one of:
   d) similar account signup times between two or more user accounts;
   e) sharing account signup IP addresses between two or more user accounts;
   f) similar signup information, including at least one of the same country code, same zip code, similar user name patterns, and similar signup interfaces between two or more user accounts;
   g) login behavior, including whether a user account sends emails each time the user logs in;
   h) similar email sending mail behavior, including a similarity of emails sent, email sizes, whether having attachments, the inter email sending time between two or more user accounts, the non-delivery reports received from those sent messages, the alphabetic and volume distribution of recipients; and
   i) account information, including at least one of the similarity of the folders in two or more email accounts, the contents of inbox in two or more email accounts, the contents of the sent messages box in two or more email accounts, and the contact list in two or more email accounts.

9. A computer implemented method for detecting bot-user accounts on a web-based email system, comprising the steps of:
   a) using a cluster of computing devices to examine a number of user account signups within a predefined period of time to detect an anomaly in the changes in the user account data, said anomaly detected by constructing a graph wherein the vertices are user accounts and a pair of vertices are connected by an edge if the corresponding two user accounts share a common account characteristic within a predefined period of time; and
   b) using the cluster of computing devices to identify one or more bot-user groups from a group of user accounts sharing a threshold number of IP addresses within a predefined period of time.

10. The computer-implemented method of claim 9, wherein said step a) of constructing a graph wherein vertices are connected by an edge if the corresponding two user accounts share a common account characteristic comprises the step of vertices being connected by an edge if the corresponding two user accounts share one or more of the same IP addresses within a predefined period of time.

11. The computer-implemented method of claim 10, further comprising the step of assigning a weight to an edge between any pairs of vertices, the weight of an edge between a pair of vertices representing the number of different ASes where two corresponding user accounts share IP addresses.

12. The computer-implemented method of claim 11, wherein a disproportionate drop off in the amount of connected vertices from one weight to the next successive weight indicates one or more bot-user groups at the lower weight.

13. The computer-implemented method of claim 12, further comprising examining the one or more bot-user groups identified at the lower weight to determine how many bot-user groups are in the one or more identified bot-user groups.

14. The computer-implemented method of claim 9, further comprising the step of pruning the results by examining the size of emails and the number of emails per day sent from different user accounts in a candidate group of user accounts, with email sizes more uniformly distributed indicating that the accounts in the group are less likely to be bot-user accounts.

15. The computer-implemented method of claim 9, wherein the common account characteristic shared by the two user accounts include at least one of:
   c) similar account signup times between the two user accounts;
   d) sharing account signup IP addresses between the two user accounts;
   e) similar signup information, including at least one of the same country code, same zip code, similar user name patterns, and similar signup interfaces between the two user accounts;
   f) login behavior, including whether a user account sends emails each time the user logs in;
   g) similar email sending mail behavior, including a similarity of number of emails sent, email sizes, whether having attachments, the inter email sending time between the two user accounts, a number of non-delivery reports received from those sent messages, the alphabetic and volume distribution of recipients; and
   h) account information, including at least one of the similarity of the folders in the two email accounts, the contents of inbox in the two email accounts, a contents of the sent messages box in the two email accounts, and the content of contact list in the two email accounts.

16. A computer implemented method for detecting bot-user accounts on a web-based email system, comprising the steps of:
   a) constructing a graph wherein the vertices are user accounts and a pair of vertices are connected by an edge if the corresponding two user accounts share one or more of the same IP addresses within a predefined period of time;
   b) assigning a weight to an edge between any pairs of vertices, the weight of an edge between a pair of vertices representing the number of IP addresses shared between the corresponding two user accounts; and
   c) examining the number of user accounts connected by vertices at successive weights, wherein a disproportionate drop off in the amount of connected vertices from one weight to the next successive weight indicates one or more bot-user groups at the lower weight.

17. The computer implemented method of claim 16, further comprising the step of examining historical user account data to detect an anomaly in the changes in the volume of account signup data within a predefined period of time.

* * * * *